US012703467B2

(12) United States Patent
Morozumi et al.

(10) Patent No.: US 12,703,467 B2
(45) Date of Patent: Aug. 11, 2026

(54) MOBILE OBJECT CONTROL SYSTEM, MOBILE OBJECT CONTROL DEVICE, AND MOBILE OBJECT CONTROL METHOD

(71) Applicant: HONDA MOTOR CO., LTD., Tokyo (JP)

(72) Inventors: Daiki Morozumi, Wako (JP); Chiaki Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/056,798

(22) Filed: Feb. 19, 2025

(65) Prior Publication Data

US 2025/0269944 A1 Aug. 28, 2025

(30) Foreign Application Priority Data

Feb. 22, 2024 (JP) ................................ 2024-025911
Jun. 28, 2024 (JP) ................................ 2024-105626

(51) Int. Cl.
*B63G 8/16* (2006.01)
*G05D 1/49* (2024.01)
*G05D 109/30* (2024.01)

(52) U.S. Cl.
CPC ................ *B63G 8/16* (2013.01); *G05D 1/49* (2024.01); *G05D 2109/38* (2024.01)

(58) Field of Classification Search
None
See application file for complete search history.

(56) References Cited

U.S. PATENT DOCUMENTS 2,955,762 A * 10/1960 Dietrich, Jr. ............. G06G 7/70 703/3
2011/0094433 A1* 4/2011 Shoda .................... B63G 8/001 114/330

FOREIGN PATENT DOCUMENTS

| | | | | |
|---|---|---|---|---|
| JP | 6167317 | | 7/2017 | |
| JP | 6167317 | B2 * | 7/2017 | B63G 8/26 |
| KR | 102275493 | B1 * | 7/2021 | B25J 11/00 |

* cited by examiner

*Primary Examiner* — Hitesh Patel
*Assistant Examiner* — Wenyuan Yang
(74) *Attorney, Agent, or Firm* — Amin, Turocy & Watson, LLP

(57) ABSTRACT

A mobile object control system includes a robot body, a floating device having a smaller density than a body connected to the robot body and including a drive unit that is able to change a center of buoyancy of the floating device with respect to the robot body, and a processor. The processor executes a program to perform calculating a control value for the drive unit for change in the center of buoyancy of the floating device using a deviation between a position of the center of buoyancy and a position of the center of gravity, a target value of the deviation, a center-of-gravity sensitivity matrix indicating change of the position of the center of gravity with respect to the control value, and a center-of-buoyancy sensitivity matrix indicating change of the position of the center of buoyancy with respect to the control value.

8 Claims, 18 Drawing Sheets

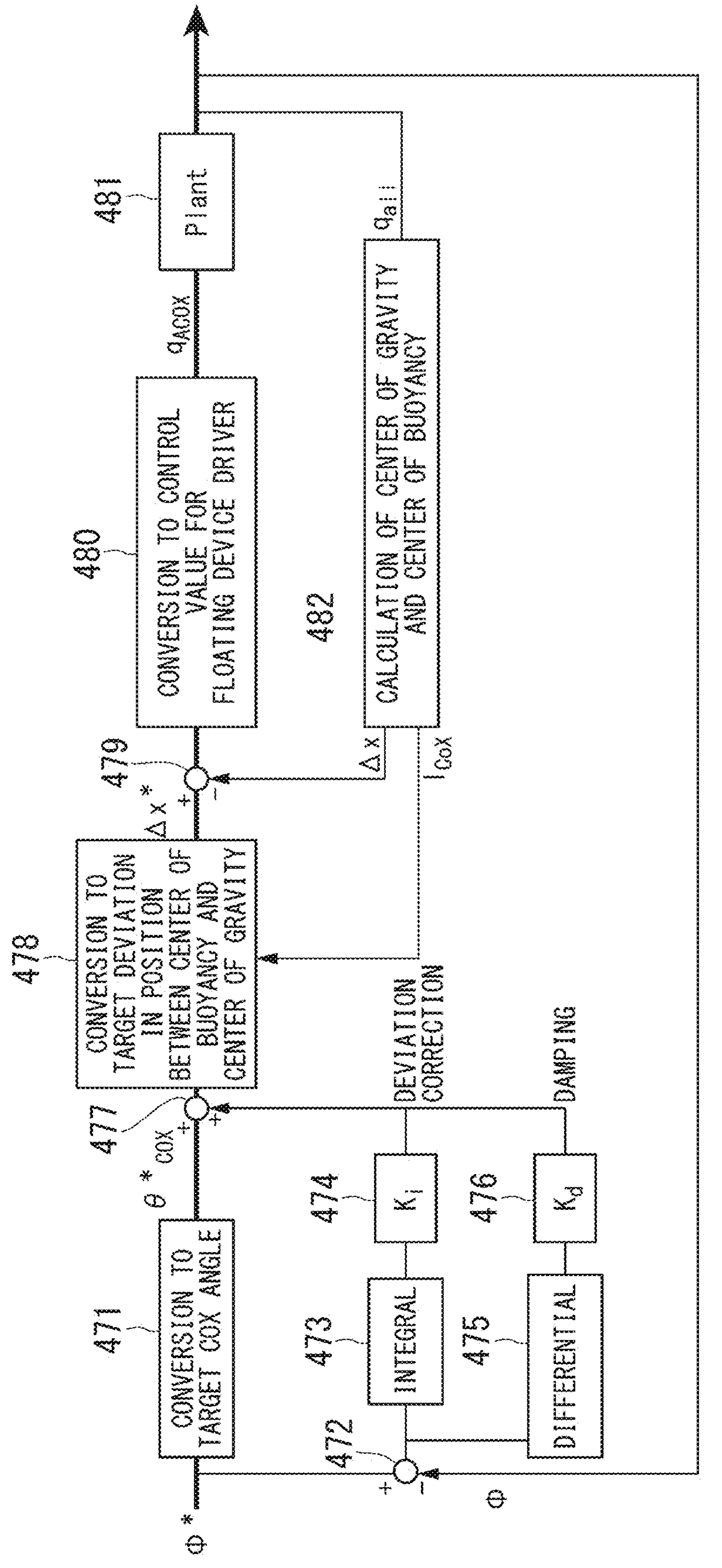

FIG. 6

$\Phi^*$

471 CONVERSION TO TARGET COX ANGLE $\theta^*_{COX}$

472

+ −

$\Phi$

473 INTEGRAL

474 $K_i$

475 DIFFERENTIAL

476 $K_d$

DEVIATION CORRECTION

DAMPING

477

+ +

478 CONVERSION TO TARGET DEVIATION IN POSITION BETWEEN CENTER OF BUOYANCY AND CENTER OF GRAVITY $\Delta x^*$

479

+ −

$\Delta x$ $l_{COX}$

480 CONVERSION TO CONTROL VALUE FOR FLOATING DEVICE DRIVER

482 CALCULATION OF CENTER OF GRAVITY AND CENTER OF BUOYANCY $q_{ACOX}$

481 Plant $q_{all}$

FIG. 8

| FACTOR | DETAILS |
|---|---|
| ERROR FROM COMMAND VALUE FOR MOVING MECHANISM | WHEN MOVEMENT OF CENTER OF GRAVITY PRECEDES MOVEMENT OF CENTER OF BUOYANCY DUE TO FAST MOVEMENT OF ARM OR THE LIKE AND POSITIONAL RELATIONSHIP BETWEEN CENTER OF GRAVITY AND CENTER OF BUOYANCY COLLAPSES |
| THRUSTER | TILT OF CRAFT BODY DUE TO THRUST OF THRUSTER |
| ERROR BETWEEN ACTUAL DEVICE AND CALCULATED VALUE | ATTACHMENT ERROR, BUBBLES, DETERIORATION, PARTS NOT INCLUDED IN CALCULATION, AND THE LIKE |
| TIDAL CURRENT | TILT DUE TO CONSTANT CURRENT, CHANGE OF WATER CURRENT NEAR STRUCTURE, AND THE LIKE |
| HEAVY OBJECT | LIFTING, CARRYING, AND THE LIKE OF HEAVY OBJECT |

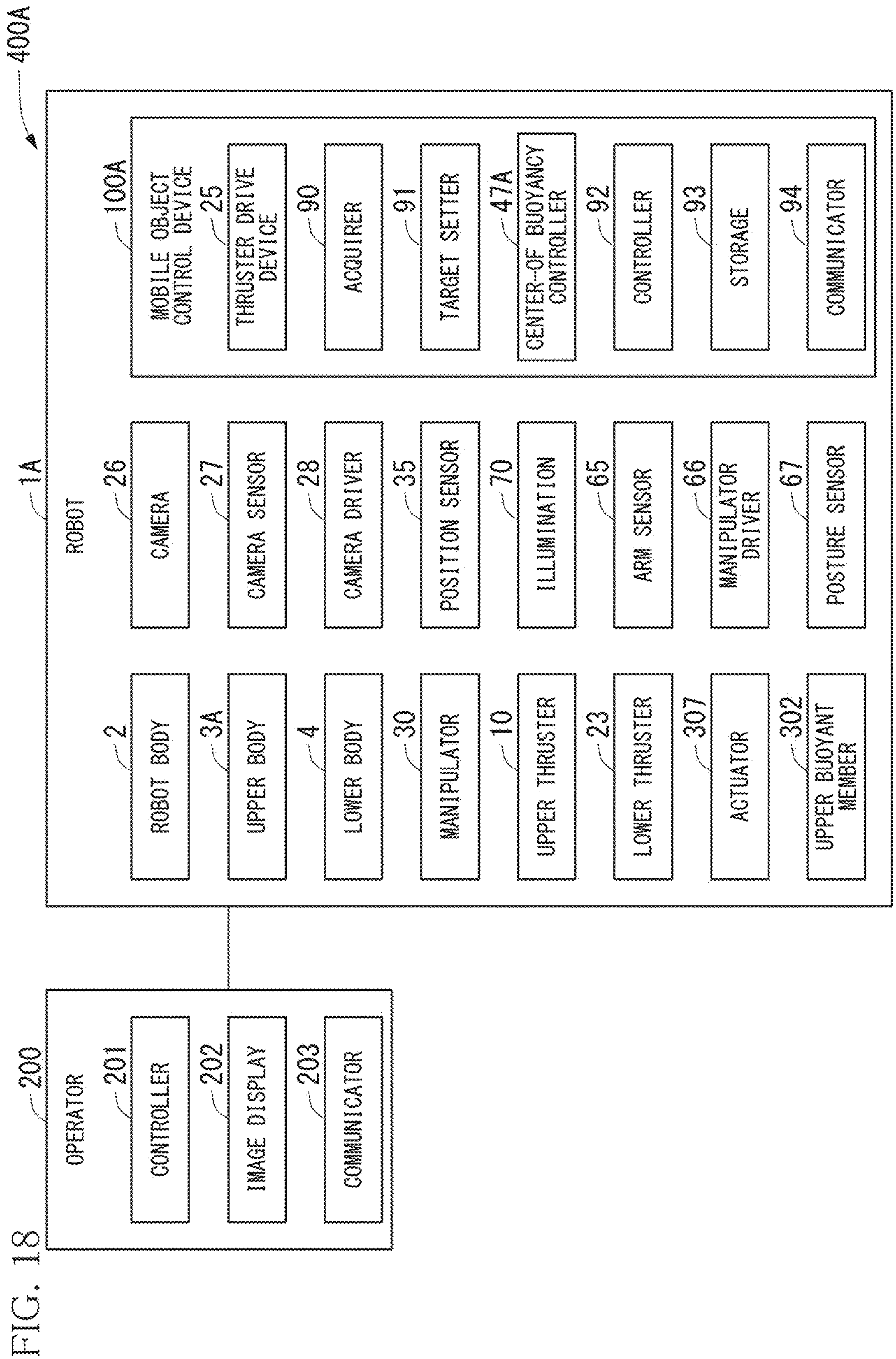

FIG. 18
400A
200
OPERATOR
201 CONTROLLER
202 IMAGE DISPLAY
203 COMMUNICATOR
1A
ROBOT
2 ROBOT BODY
3A UPPER BODY
4 LOWER BODY
30 MANIPULATOR
10 UPPER THRUSTER
23 LOWER THRUSTER
307 ACTUATOR
302 UPPER BUOYANT MEMBER
26 CAMERA
27 CAMERA SENSOR
28 CAMERA DRIVER
35 POSITION SENSOR
70 ILLUMINATION
65 ARM SENSOR
66 MANIPULATOR DRIVER
67 POSTURE SENSOR
100A MOBILE OBJECT CONTROL DEVICE
25 THRUSTER DRIVE DEVICE
90 ACQUIRER
91 TARGET SETTER
47A CENTER-OF BUOYANCY CONTROLLER
92 CONTROLLER
93 STORAGE
94 COMMUNICATOR

MOBILE OBJECT CONTROL SYSTEM, MOBILE OBJECT CONTROL DEVICE, AND MOBILE OBJECT CONTROL METHOD

CROSS-REFERENCE TO RELATED APPLICATION

Priority is claimed on Japanese Patent Application No. 2024-25911, filed Feb. 22, 2024 and Japanese Patent Application No. 2024-105626, filed Jun. 28, 2024, the contents of which are incorporated herein by reference.

BACKGROUND OF THE INVENTION

Field of the Invention

The present invention relates to a mobile object control system, a mobile object control device, and a mobile object control method.

Description of Related Art

There is an underwater robot which is a device performing an operation under water. Such an underwater robot includes, for example, a frame, a thruster unit, a weight, a buoyant member, and a drive mechanism. The thruster unit includes a plurality of thrusters that generate thrust. The weight moves a position of the center of gravity through movement in a direction of a first axis. The buoyant member moves a position of the center of buoyancy through movement in a direction of a second axis. The drive mechanism moves the weight in the direction of the first axis and moves the buoyant member in the direction of the second axis in synchronization with each other (for example, see Japanese Patent No. 6167317).

SUMMARY OF THE INVENTION

In a control method according to the related art, for example, since a relationship between an angle formed by the center of buoyancy and the center of gravity and an amount of operation of a buoyant member is linearly approximated and a control angle value for the buoyant member is calculated in order to keep a craft body at a target posture, an approximate expression needs to be constructed for each posture of a driven portion such as an arm.

The present invention was made in consideration of the aforementioned circumstances, and an objective thereof is to provide a mobile object control system, a mobile object control device, and a mobile object control method that can keep a craft body at a target posture without constructing an appropriate expression for each posture of a driven portion such as a buoyant member.

(1) In order to achieve the aforementioned objective, according to an aspect of the present invention there is provided a mobile object control system that controls a robot performing an operation under water, the mobile object control system including: a robot body; a floating device having a smaller density than a body connected to the robot body and including a drive unit that is able to change the center of buoyancy of the floating device with respect to the robot body; and a processor, wherein the processor executes a program to perform: acquiring a position of the center of buoyancy of the robot body and the floating device combined, a position of the center of gravity of the robot body and the floating device combined, an angle formed by the position of the center of buoyancy and the position of the center of gravity, and a posture angle of the robot body; setting at least one of a target value of an angle formed by the position of the center of gravity from a target posture of the whole robot and a target value of an angle formed by the position of the center of buoyancy from the target posture of the whole robot; and calculating a control value for the drive unit for change in the center of buoyancy of the floating device using a deviation (for example, Δx) between the position of the center of buoyancy and the position of the center of gravity, a target value (for example, Δx*) of the deviation between the position of the center of buoyancy and the position of the center of gravity, a center-of-gravity sensitivity matrix (for example, $J_{COB}$) indicating change of the position of the center of gravity with respect to the control value for the drive unit, and a center-of-buoyancy sensitivity matrix (for example, $J_{COG}$) indicating change of the position of the center of buoyancy with respect to the control value for the drive unit.

(2) In the mobile object control system according to the aspect of (1), the processor may perform feedback control in which a differential value of the posture angle of the robot body as a velocity term is substituted into the target value of the angle (for example, a COX angle) formed by the position of the center of buoyancy and the position of the center of gravity.

(3) In the mobile object control system according to the aspect of (1) or (2), the processor may perform feedback control in which an integral term of a deviation of the posture angle of the robot body is substituted into the target value of the angle (for example, a COX angle) formed by the position of the center of buoyancy and the position of the center of gravity.

(4) In the mobile object control system according to any one of the aspects of (1) to (3), the robot may include a movable portion and a stationary portion, the movable portion may be connected to the stationary portion by a link which is movable in at least one of a pitch direction and a roll direction, and the processor may control the position of the center of buoyancy or the position of the center of gravity of the robot body by moving the link in at least one of the pitch direction and the roll direction based on the calculated control value for the drive unit.

(5) In the mobile object control system according to any one of the aspects of (1) to (3), the robot may include a movable portion and a stationary portion, the movable portion may include a member for controlling the position of the center of buoyancy or the position of the center of gravity of the whole robot through two-dimensional movement, and the processor may control the position of the center of buoyancy or the position of the center of gravity of the robot body by moving the movable portion in at least one of the pitch direction and the roll direction based on the calculated control value for the drive unit.

(6) In the mobile object control system according to the aspect of (1), the processor may convert the target value (for example, $\phi^*$) of the posture angle (for example, $\phi$) to a target angle ($\theta^*_{cox}$), the processor may convert the converted target angle to a target deviation (for example, Δx*) between the position of the center of buoyancy and the position of the center of gravity using a distance (for example, $l_{COX}$) between the position of the center of buoyancy and the position of the center of gravity, and the processor may convert the converted target deviation between the position of the center of buoyancy and the position of the center of gravity and the deviation (Δx) between the position of the center of buoyancy and the position of the center of gravity to a control value (for example, $q_{ACOX}$) for the floating device.

(7) In order to achieve the aforementioned objective, according to another aspect of the present invention there is provided a mobile object control device that controls a robot including a floating device having a smaller density than a body connected to a robot body performing an operation under water and including a drive unit that is able to change the center of buoyancy of the floating device with respect to the robot body. The mobile object control device includes a processor. The processor executes a program to perform: acquiring a position of the center of buoyancy of the robot body and the floating device combined, a position of the center of gravity of the robot body and the floating device combined, an angle formed by the position of the center of buoyancy and the position of the center of gravity, and a posture angle of the robot body; setting at least one of a target value of an angle formed by the position of the center of gravity from a target posture of the whole robot and a target value of an angle formed by the position of the center of buoyancy from the target posture of the whole robot; and calculating a control value for the drive unit for change in the center of buoyancy of the floating device using a deviation between the position of the center of buoyancy and the position of the center of gravity, a target value of the deviation between the position of the center of buoyancy and the position of the center of gravity, a center-of-gravity sensitivity matrix indicating change of the position of the center of gravity with respect to the control value for the drive unit, and a center-of-buoyancy sensitivity matrix indicating change of the position of the center of buoyancy with respect to the control value for the drive unit.

(8) In order to achieve the aforementioned objective, according to another aspect of the present invention there is provided a mobile object control method of controlling a robot including a floating device having a smaller density than a body connected to a robot body performing an operation under water and including a drive unit that is able to change the center of buoyancy of the floating device with respect to the robot body, the mobile object control method including: acquiring a position of the center of buoyancy of the robot body and the floating device combined, a position of the center of gravity of the robot body and the floating device combined, an angle formed by the position of the center of buoyancy and the position of the center of gravity, and a posture angle of the robot body; setting at least one of a target value of an angle formed by the position of the center of gravity from a target posture of the whole robot and a target value of an angle formed by the position of the center of buoyancy from the target posture of the whole robot; and calculating a control value for the drive unit for change in the center of buoyancy of the floating device using a deviation between the position of the center of buoyancy and the position of the center of gravity, a target value of the deviation between the position of the center of buoyancy and the position of the center of gravity, a center-of-gravity sensitivity matrix indicating change of the position of the center of gravity with respect to the control value for the drive unit, and a center-of-buoyancy sensitivity matrix indicating change of the position of the center of buoyancy with respect to the control value for the drive unit.

According to the aspects of (1) to (8), it is possible to keep a craft body at a target posture without constructing an appropriate expression for each posture of a driven portion such as a buoyant member.

BRIEF DESCRIPTION OF THE DRAWINGS

FIG. 6 is a block diagram showing a control process for the floating device according to the first embodiment.

FIG. 8 is a diagram showing an example of factors for an error.

FIG. 18 is a diagram showing an example of a configuration of a mobile object control system according to the second embodiment.

DETAILED DESCRIPTION OF THE INVENTION

Figure 1:
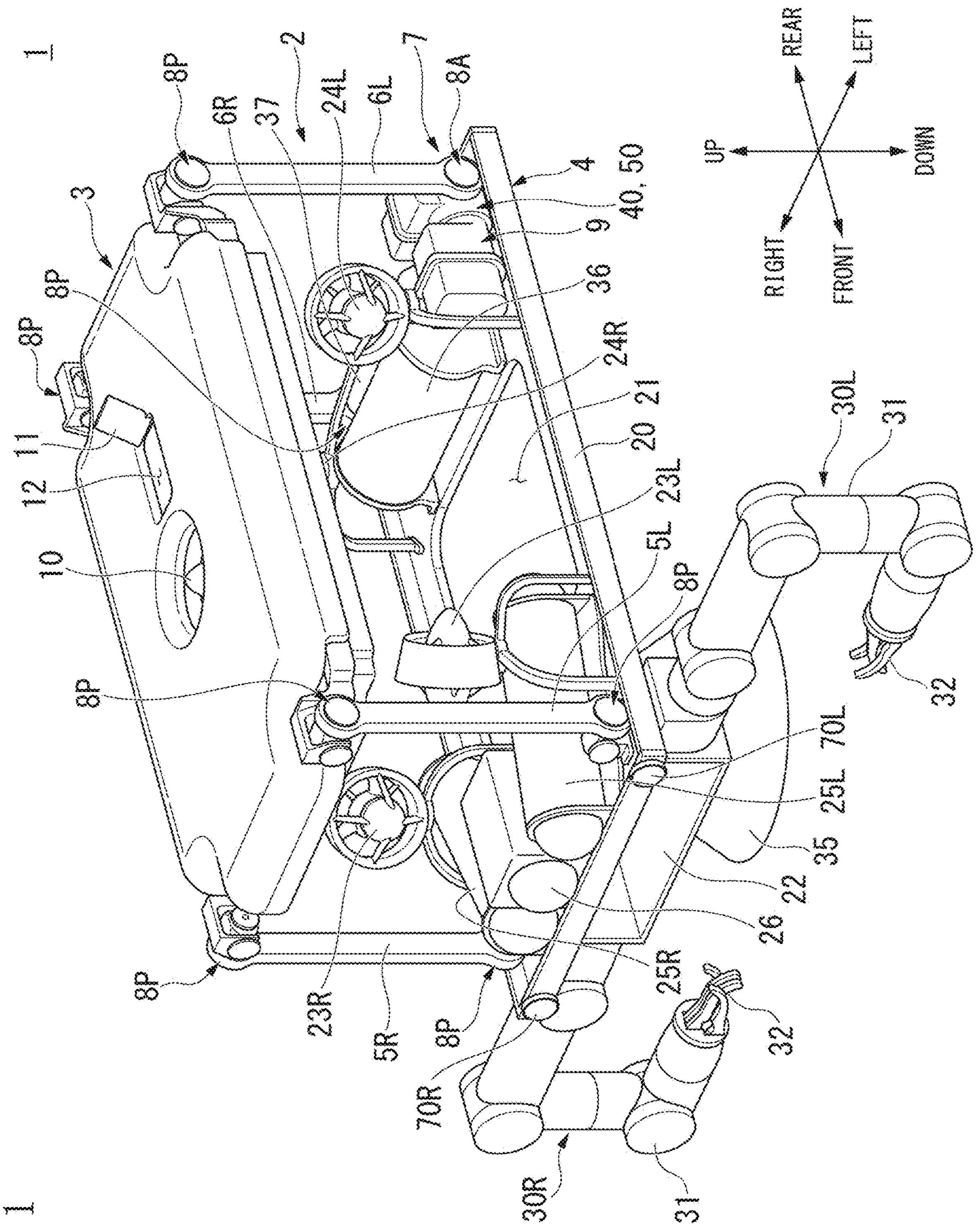
FIG. 1 is a perspective view of a robot according to a first embodiment.

Hereinafter, embodiments of the present invention will be described with reference to the accompanying drawings. In the following description, a robot (a remote operating vehicle (ROV)) that performs an operation under the sea (an example of under the water) through remote control using wired communication or the like will be described as an example of a robot which is an example of a mobile object. In the following description, expressions expressing relative or absolute arrangement such as “parallel,” “perpendicular,” “center,” and “coaxial” mean such arrangement and also include relative displacement with a tolerance or such an angle or distance that the same function is achieved. In the drawings used for the following description, scales of constituent members are appropriately changed in order to make the constituent members be shown in recognizable sizes.

In all the drawings used to describe embodiments, constituent members having the same functions will be referred to by the same reference signs, and repeated description thereof will be omitted.

"On the basis of XX" mentioned in this specification means "on the basis of at least XX" and includes "on the basis of another element in addition to XX." "On the basis of XX" is not limited to direct use of XX and includes use of results obtained by performing calculation or processing on XX. "XX" is an arbitrary factor (for example, arbitrary information).

First Embodiment

In a first embodiment, for example, it is assumed that an upper body and a lower body of a robot are connected by a link mechanism.

<Robot>

An outer shape or the like of a robot 1 according to the present embodiment will be first described. FIG. 1 is a perspective view of the robot according to the present embodiment.

As shown in FIG. 1, the robot 1 includes a robot body 2 which is a body of the robot 1. The robot body 2 includes an upper body 3 (a movable portion) that is located in an upper part of the robot body 2 and a lower body 4 (a stationary portion) that is located in a lower part of the robot body 2.

In the following description, a direction in which the robot 1 moves forward is defined as a "front side," a direction opposite to the front side is defined as a "rear side," a right hand in the direction in which the robot 1 moves forward is defined as a "right side," a left hand in the direction in which the robot 1 moves forward is defined as a "left side," and the right-left direction of the robot 1 is defined as a "width direction." An up-down direction of the robot 1 is defined as a direction which is perpendicular to the longitudinal direction and the width direction of the robot 1. The upper side of the robot 1 is a side on which the upper body 3 is located in the up-down direction of the robot 1. The lower side of the robot 1 is a side (a side on which the lower body 4 of the robot 1 is located) opposite to the side on which the upper body 3 is located in the up-down direction of the robot 1. In the example shown in the drawing, the robot 1 is disposed horizontally. The up-down direction of the robot 1, the upper side of the robot 1, and the lower side of the robot 1 correspond to the up-down direction (a vertical direction), the vertical upper side, and the vertical lower side in the state in which the robot 1 is disposed horizontally. In the following description, elements on the left side of the robot 1 may have reference sign L added to the ends thereof, and elements on the right side may have reference sign R added to the ends thereof.

<Upper Body>

The upper body 3 is located, for example, in the upper part of the robot body 2. The upper body 3 has a larger buoyant force than the lower body 4. The upper body 3 has, for example, a rectangular outer shape in a plan view. For example, in order to keep the robot 1 horizontal, a ballast and a buoyant member are provided in the upper body 3. An upper thruster 10 for moving the robot 1 in the vertical direction (hereinafter also referred to as an "upper thruster 10") is provided in the upper body 3. The upper thruster 10 is disposed at a position which is the center in a longitudinal direction and the center in a width direction of the upper body 3.

The upper thruster 10 includes, for example, a propeller that rotates around a up-down shaft of the upper body 3. For example, the upper thruster 10 moves (raises) the robot 1 upward by rotating the propeller in one direction around the shaft. For example, the upper thruster 10 moves (lowers) the robot 1 downward by rotating the propeller in the other direction around the shaft.

For example, an attachment 11 of a power line for sending electric power to constituents of the robot 1 or a signal line for sending a signal (not shown) is provided in the upper body 3. A through-hole 12 through which the power line or the signal line passes is formed in front of or behind the attachment 11 in the upper body 3. A posture sensor (for example, a gyro sensor) for detecting a posture (rotation or orientation in the longitudinal direction, the width direction, and the vertical direction) of the robot 1 may be provided in the vicinity of the attachment 11. For example, the posture sensor may be provided at a position to which an arm is attached. In the following description, the upper body 3 may also be referred to as "Upper."

<Lower Body>

The lower body 4 is located, for example, in the lower part of the robot body 2. The lower body 4 has a larger weight and a smaller buoyant force (volume) than the upper body 3. The lower body 4 has, for example, a rectangular outer shape in a plan view. For example, in order to keep the robot 1 horizontal and to set the weight to be larger than that of the upper body 3, a weight is provided in the lower body 4. In the following description, the lower body 4 may also be referred to as "Lower."

The lower body 4 includes, for example, a frame 20 having a rectangular outer shape in a plan view. The frame 20 has, for example, a rectangular outer shape which is long in the longitudinal direction. In the frame 20, for example, an opening 21 is formed in a part overlapping the upper thruster 10 in a top view. A bracket 22 which is long in the width direction is provided below the front of the frame 20.

For example, a plurality of lower thrusters 23L, 23R, 24L, and 24R for moving the robot 1 in the longitudinal direction and the width direction are provided in the lower body 4. The plurality of lower thrusters 23L, 23R, 24L, and 24R include a total of four thrusters (which correspond to four horizontal thrusters) including a pair of front thrusters 23L and 23R on the right and left sides for moving the robot 1 forward or in the width direction and a pair of rear thrusters 24L and 24R on the right and left sides for moving the robot 1 rearward or in the width direction.

The front thrusters 23L and 23R are provided, for example, in a front part of the frame 20. Each of the front thrusters 23L and 23R includes, for example, a propeller rotating around an axis which is tilted to be located outside in the width direction from the front to the rear of the lower body 4.

The rear thrusters 24L and 24R are provided, for example, in a rear part of the frame 20. Each of the rear thrusters 24L and 24R includes, for example, a propeller rotating around an axis which is tilted to be located outside in the width direction from the near to the front of the lower body 4.

Thruster drive devices 25L and 25R for supplying a driving force (a rotational force for each propeller) to the thrusters 10, 23L, 23R, 24L, and 24R are provided in the lower body 4. A pair of thruster drive devices 25L and 25R is provided on the left and right sides of the front of the frame 20.

For example, a camera 26 is provided in the lower body 4.

Illuminations 70L and 70R are provided, for example, on the front side of the lower body 4. When one of the illuminations 70L and 70R is not identified, they are referred to as an illumination 70. The illumination 70 is a device that can change an ON state and an OFF state of the illumination, illuminance of the illumination, a tilt of the illumination, and the like on the basis of an illumination control signal.

A pair of manipulators 30L and 30R is provided on the left and right sides of the lower body 4. The manipulators 30L and 30R include an arm 31 and a hand 32.

The arm 31 is constituted as a combination of a joint and a link. A base end of the arm 31 is connected to an outer end in the width direction of the bracket 22. The base end of the arm 31 is connected to the frame 20 via the bracket 22. For example, the arm 31 has six rotation axes.

The hand 32 is provided at a tip end of the arm 31 (an end opposite to the base end of the arm 31). The hand 32 can grasp an object. In the shown in the drawing, the hand 32 includes three fingers.

For example, a position sensor 35 for detecting a position of the robot 1 (for example, a distance from the sea bottom to the robot 1) is provided in the lower body 4. For example, the position sensor 35 is an ultrasonic sensor. In the shown example, the position sensor 35 is provided between the pair of manipulators 30L and 30R on the left and right sides of the front of the frame 20. The position sensor 35 includes, for example, a Doppler velocity log (DVL) sensor for constant-height navigation, an internal pressure sensor for constant-depth navigation, and an inertial measurement unit (IMU).

For example, power supply systems 36 and 37 are provided in the lower body 4.

A weight installation area 38 in which a weight is installed may be provided in the lower body 4. The weight installation area 38 is provided, for example, behind the power supply system 37 on the rear side of the frame 20.

The robot 1 includes the manipulators 30L and 30R and the power supply systems 36 and 37. The manipulators 30L and 30R are provided on the front side (which is an example of one side in the longitudinal direction) of the lower body 4. The power supply systems 36 and 37 are provided on the rear side (which is an example of the other side in the longitudinal direction) of the lower body 4. The manipulators 30L and 30R are provided opposite to the installation positions of the power supply systems 36 and 37 in the longitudinal direction of the lower body 4 with the opening 21 interposed therebetween.

<Link>

The upper body 3 and the lower body 4 are connected to a plurality of links 5L, 5E, 6L, and 6R using connectors 7. The plurality of links 5L, 5R, 6L, and 6R are arranged to be parallel with each other. The plurality of links 5L, 5R, 6L, and 6R extend to be suspended between four corners on the upper side of the upper body 3 and four corners on the lower side of the lower body 4. The plurality of links 5L, 5R, 6L, and 6R include a total of four links including a pair of front links 5L and 5R on the left and right sides and a pair of rear links 6L and 6R on the left and right sides. The upper body 3 and the lower body 4 are connected in parallel to the four links 5L, 5R, 6L, and 6R. When one of the links 5L and 5R is not identified, the links are referred to as a link 5. When one of the links 6L and 6R is not identified, the links are referred to as a link 6.

<Joint>

The connectors 7 include joints 8A and 8P which can rotate in the pitch direction and the roll direction of the robot body 2. A total of eight joints 8A and 8P are provided at upper ends and lower ends of the four links 5L, 5R, 6L, and 6R.

The robot 1 includes an actuator 9 that can rotate the links 5L, 5R, 6L, and 6R in the pitch direction and the roll direction in one joint 8A (which is an example of at least one joint) out of the eight joint 8A and 8P. The actuator 9 is provided in the joint 8A at the lower end of the left-rear link 6L out of the four links 5L, 5R, 6L, and 6R.

In the following description, the joint 8A provided with the actuator 9 is referred to as a "joint driving unit 8A," and the joints 8P (joints 8P not provided with the actuator 9) that operate with movement of the joint driving unit 8A are also referred to as "passive joints 8P." The robot 1 includes one joint driving unit 8A and seven passive joints 8P.

<Joint Driving Unit>

A pitching drive device 40 for rotating the links 5L, 5R, 6L, and 6R in the pitch direction and a rolling drive device 50 for rotating the links 5L, 5R, 6L, and 6R in the roll direction are provided as the actuator 9 in the joint driving unit 8A.

The pitching drive device 40 includes, for example, a pitching motor for rotating the links 5L, 5R, 6L, and 6R in the pitch direction, a driven pulley for decreasing a rotation speed of the pitching motor to equal to or lower than a predetermined speed, a reduction gear for further decelerating the rotation decelerated by the driven pulley, and a case for accommodating the pitching motor and the driven pulley. The pitching drive device 40 is controlled by a center-of buoyancy controller 47 (see FIG. 5). For example, Japanese Patent Application No. 2023-029174 is referred to for a structure example of the pitching drive device 40.

The rolling drive device 50 includes, for example, a rolling motor for rotating the links 5L, 5R, 6L, and 6R in the roll direction, a driven pulley for decreasing a rotation speed of the rolling motor to equal to or lower than a predetermined speed, a reduction gear for further decelerating the rotation decelerated by the driven pulley, and a case for accommodating the rolling motor and the driven pulley. The rolling drive device 50 is controlled by a center-of buoyancy controller 47 (see FIG. 5). For example, Japanese Patent Application No. 2023-029174 is referred to for a structure example of the rolling drive device 50.

<Passive Joint>

The configuration provided at the lower end of the left-front link 5L out of seven passive joints 8P will be described below. The configurations of the passive joints 8P provided in the other parts are the same as the configuration provided at the lower end of the left-front link 5L, and thus detailed description thereof will be omitted.

A mechanism, a so-called gimbal mechanism, that can tilt in an arbitrary direction through combination of two axes perpendicular to each other is provided in the passive joint 8P.

The gimbal mechanism includes a gimbal body which is a body of the gimbal mechanism, a pitching shaft member for rotating the links 5L, 5R, 6L, and 6R in the pitch direction, a rolling shaft member for rotating the links 5L, 5R, 6L, and 6R in the roll direction, a support member that supports the rolling shaft member, and a plurality of slide bearings. For example, Japanese Patent Application No. 2023-029174 is referred to for a structure example of the gimbal mechanism.

<Example of Pitching Operation of Robot>

Figure 2:
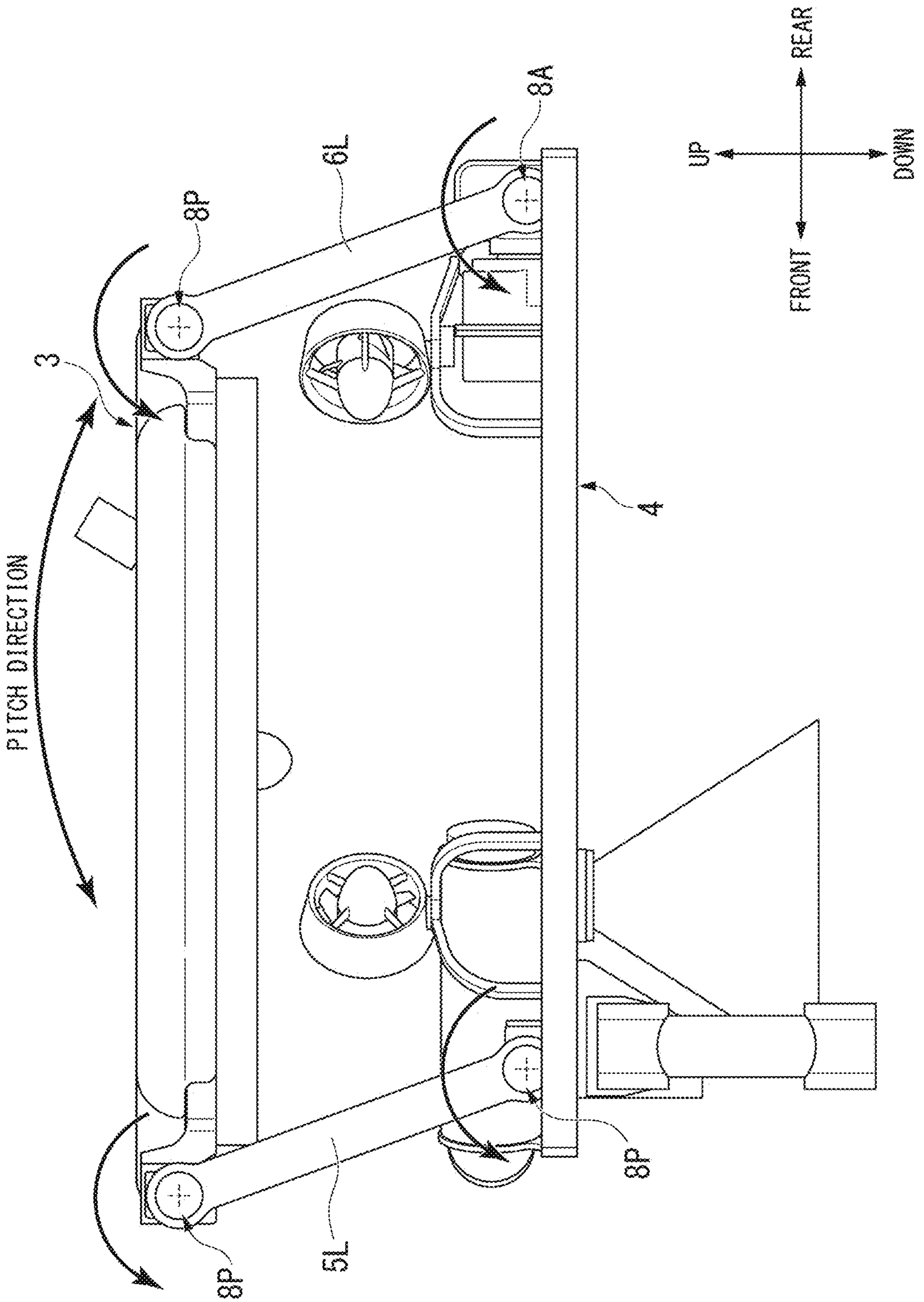
FIG. 2 is a diagram showing a pitching motion of the robot according to the first embodiment.

FIG. 2 is a diagram showing a pitching operation of the robot according to the embodiment.

For example, when an output shaft of the pitching motor 41 in the active joint 8A rotates in one direction around an axis (around an axis in the width direction), the plurality of passive joints 8P are synchronously rotated around the axis (around the axis in the width direction). Accordingly, the robot body 2 rotates in the pitch direction. In the shown example, the robot body 2 rotates in a counterclockwise direction (an example of one direction of the pitch direction) in a left side view.

<Example of Rolling Operation of Robot>

Figure 3:
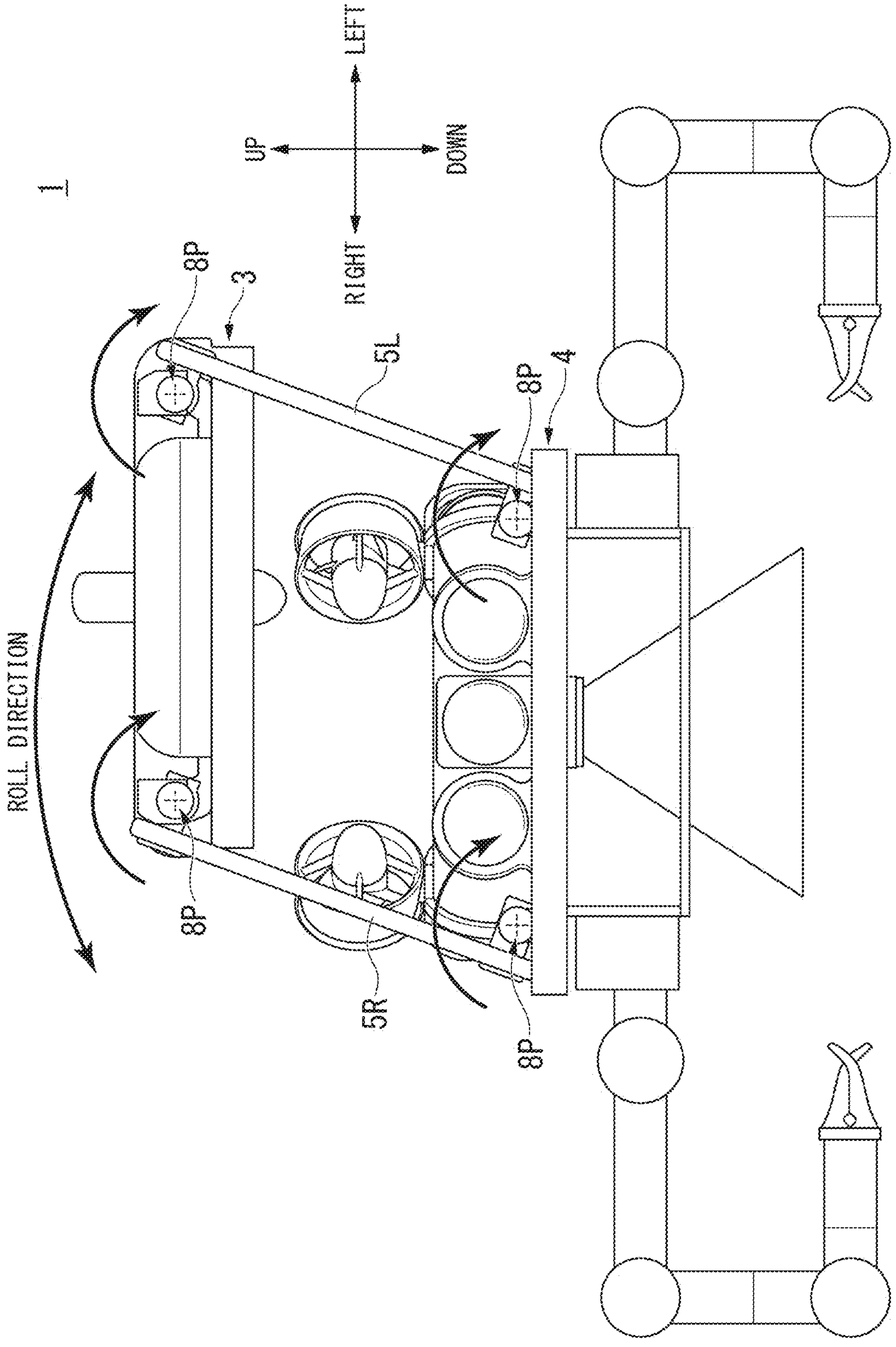
FIG. 3 is a diagram showing a rolling motion of the robot according to the first embodiment.

FIG. 3 is a diagram showing a rolling operation of the robot according to the embodiment.

For example, when an output shaft of the rolling motor 51 in the active joint 8A rotates in one direction around an axis (around an axis in the longitudinal direction), the plurality of passive joints 8P are synchronously rotated around the axis (around the axis in the longitudinal direction). Accordingly, the robot body 2 rotates in the roll direction. In the shown example, the robot body 2 rotates in a clockwise direction (an example of one direction of the roll direction) in a front view.

<Control Example Based on Movement of Floating Device at the Time of Bending and Stretching of Arm>

Figure 4:
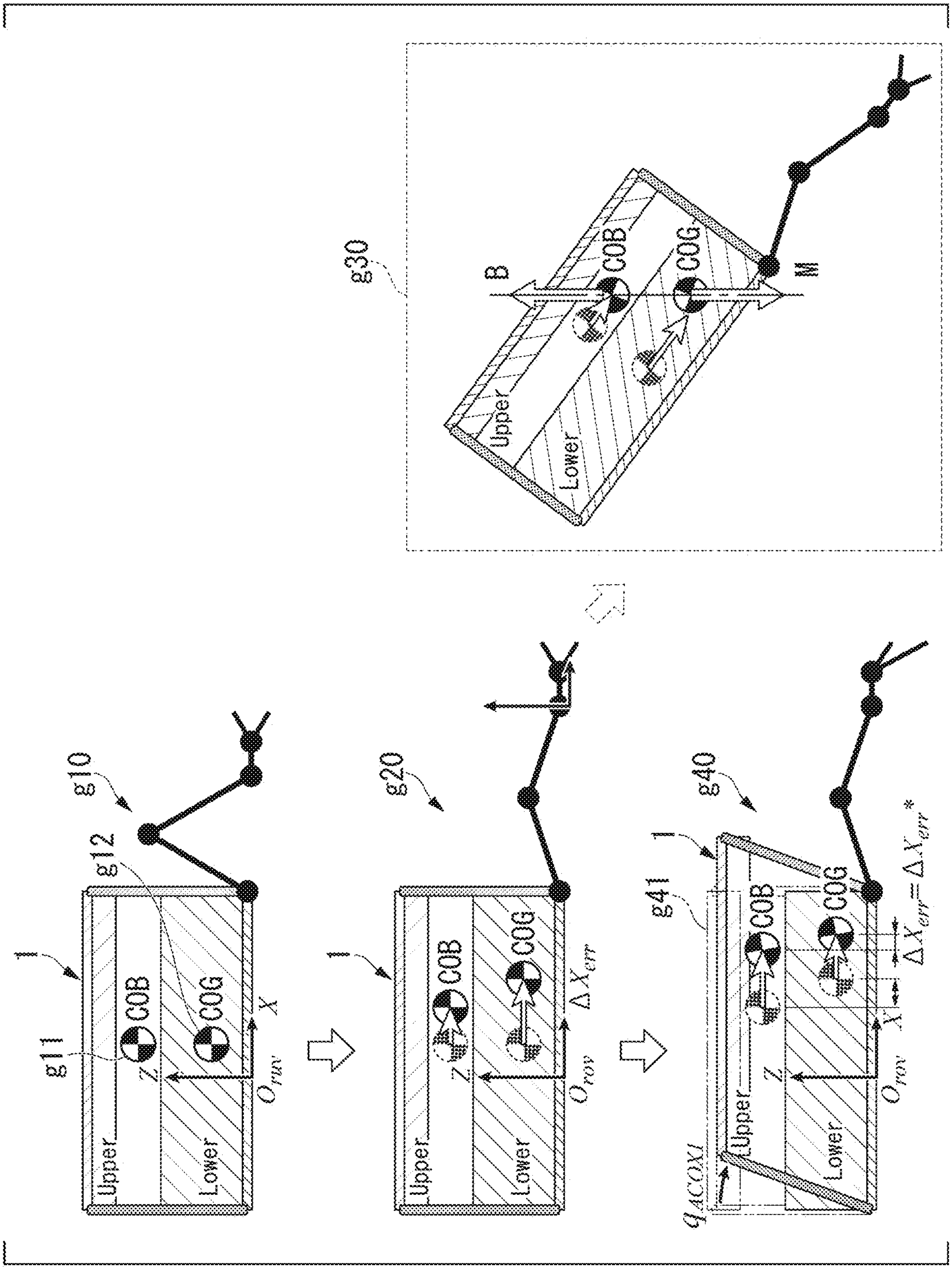
FIG. 4 is a diagram showing an example of control associated with movement of a floating device according to the first embodiment.

A control example based on movement of a floating device at the time of bending and stretching of the arm 31 according to the present embodiment will be described below. FIG. 4 is a diagram showing a control example based on movement of a floating device according to the present embodiment. In the present embodiment, a floating device includes, for example, the buoyant member and the links and the joints connected to the buoyant member. The floating device may include a driving unit. The floating device is connected to the robot body 2 and has a larger buoyant force and a smaller weight than the robot body 2 (has a smaller density than the robot body 2). In the present embodiment, a "small density" means a large buoyant force and a small-weight, that is, a smaller density.

Reference sign g10 indicates a state example before the arm 31 is stretched. Reference sign g11 denotes the center of buoyancy. Reference sign g12 denotes the center of gravity of a body. In the following description, the center of buoyancy is also referred to as "COB," and the center of gravity of the body is also referred to as "COG."

Reference sign g20 indicates a state example immediately after the arm 31 is stretched. In this case, as indicated by reference sign g20, the COB moves according to the weight of the upper body 3, the weight of the arm 31, and a stretching length of the arm 31. As indicated by reference sign g20, the COG moves according to the weight of the lower body 4, the weight of the arm 31, and the stretching length of the arm 31.

Reference sign g30 indicates a state example when an error $\Delta X_{err}$ between the center of buoyancy and the center of gravity of a craft body has not been controlled. In this case, as indicated by reference sign g30, the posture of the body is tilted such that the buoyant force B and the gravitational force M of the body match.

Reference sign g40 indicates a state example when the error between the center of buoyancy and the center of gravity of the craft body has been controlled using a method according to the present embodiment. Reference sign g41 indicates a state before the link mechanism operates. As indicated by reference sign g40, in the present embodiment, the posture of the craft body is controlled by controlling a link mechanism using an angle (a COX angle) formed by the center of buoyancy and the center of gravity and a craft body coordinate system as an amount of operation. Accordingly, even when the arm 31 is stretched in a folded state, the posture of the craft body can be maintained without collapsing. Here, $q_{ACOX1}$ is a control angle of a joint portion, and, for example, an angle in the pitch direction.

<Configuration Example of Mobile Object Control System>

Figure 5:
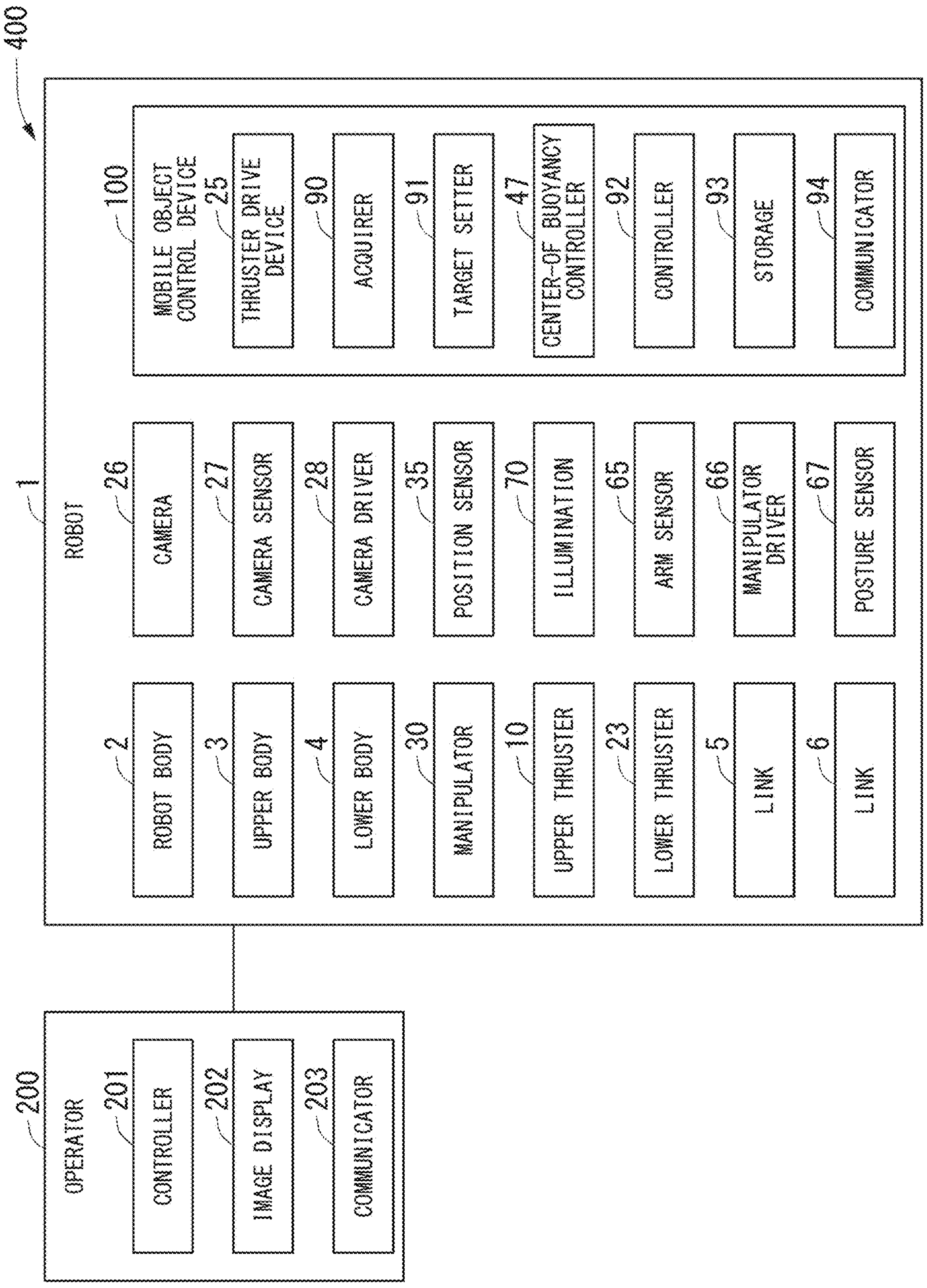
FIG. 5 is a diagram showing an example of a configuration of a mobile object control system according to the first embodiment.

An example of a configuration of a mobile object control system 400 according to the present embodiment will be described below. FIG. 5 is a diagram showing an example of the configuration of the mobile object control system according to the present embodiment. As shown in FIG. 5, the mobile object control system 400 includes, for example, a robot 1 and an operator 200.

The operator 200 includes, for example, a controller 201, an image display 202, and a communicator 203.

The robot 1 includes, for example, a robot body 2, an upper body 3, a lower body 4, a manipulator 30, an upper thruster 10, a lower thruster 23, a link 5, a link 6, a camera 26, a camera sensor 27, a camera driver 28, a position sensor 35, an illumination 70, an arm sensor 65, a manipulator driver 66, a posture sensor 67, and a mobile object control device 100. In the configuration example shown in FIG. 5, some of the constituents of the robot 1 described above with reference to FIG. 1 are not shown.

The mobile object control device 100 includes, for example, a thruster drive device 25, a center-of buoyancy controller 47, an acquirer 90, a target setter 91, a controller 92, a storage 93, and a communicator 94.

(Operator)

The operator 200 is used, for example, by an operator on a craft. The operator 200 and the mobile object control device 100 are connected to each other, for example, in a wired manner.

The controller 201 is a device that is used for the operator to input an operation command for the robot body 2 or the arm 31. The controller 201 is, for example, a handle, a joystick, or a touch panel sensor.

The image display 202 acquires an image captured by the camera 26 or a state or the like of the robot body 2 or the arm 31 from the mobile object control device 100 and displays the acquired information.

The communicator 203 transmits and receives information to and from the mobile object control device 100.

(Robot)

The robot body 2 is, for example, a part other than the arm 31 in FIG. 1. The constituents described above with reference to FIG. 1 are attached to the robot body 2.

The camera 26 is, for example, an imaging device using a complementary metal oxide semiconductor (CMOS) imaging element or an imaging device using a charge coupled device (CCD) imaging element. The camera 26 may be an RGB (red, green, and blue) D camera that can acquire depth information D.

The camera sensor 27 detects, for example, a tilt of a pan shaft of the camera 26.

The camera driver 28 tilts the camera 26, for example, in the pan shaft direction on the basis of a camera control instruction included in the control command from the controller 92. The camera driver 28 includes, for example, an actuator and a drive circuit.

The arm sensor 65 is, for example, an encoder attached to the joint or a six-axis sensor or a tactile sensor attached to a fingertip.

The manipulator driver 66 drives the arm 31 on the basis of a control command from the controller 92. The manipulator driver 66 includes, for example, an actuator and a drive circuit.

The posture sensor 67 is a sensor that detects tilt angles in the pitch direction and the roll direction of the robot body 2 and the floating device, a posture angle of the craft body, and the like. The posture sensor 67 may be an acceleration sensor, a pressure sensor, or the like. In this case, the posture of the craft body may be estimated by a known method (for example, Tomohiro Takahashi, Masatoshi Hatano, "Study of Posture Control of Underwater Movable Manipulator," 25-th Traffic and Distribution Category Meeting (TRANS-LOG2016), the Japan Society of Mechanical Engineers, 2016) using detected values from the acceleration sensor, the pressure sensor, and the like.

(Mobile Object Control Device)

The thruster drive device 25 generates a thruster control instruction and drives the upper thruster 10 and the lower thruster 23.

The center-of buoyancy controller 47 calculates control angles $q_{ACOX1}$ and $q_{ACOX2}$ for removing the center of buoyancy in the pitch direction and the roll direction (or the x-axis direction and the y-axis direction). The control angle $q_{ACOX2}$ is, for example, an angle in the roll direction. The center-of buoyancy controller 47 controls the links 5 and 6 such that the upper body 3 operates in at least one direction of the pitch direction and the roll direction using the calculated control angles $q_{ACOX1}$ and $q_{ACOX2}$. The control method in the center-of buoyancy controller 47 will be described later.

The acquirer 90 acquires a position of the center of buoyancy of the body and the floating device combined, a position of the center of gravity of the body and the floating device combined, an angle θ formed by the position of the center of buoyancy and the position of the center of gravity, and a posture angle ϕ of the body from the posture sensor 67 and the like. The acquirer 90 may acquire the position of the center of buoyancy and the position of the center of gravity through calculation based on the acquired detected values. Alternatively, the center-of buoyancy controller 47 may acquire the position of the center of buoyancy and the position of the center of gravity through calculation based on the detected values acquired by the acquirer 90.

The target setter 91 sets a target value of the angle formed by the center of buoyancy and the center of gravity from the target posture.

The controller 92 controls, for example, operations of the robot body 2, the arm 31, and the camera 26.

The storage 93 stores programs, threshold values, predetermined values, mathematical expressions, and the like required for control of the mobile object control device 100. The storage 93 stores, for example, a three-dimensional model of the robot body 2 or the arm 31.

The communicator 94 transmits and receives information to and from the operator 200.

<Process of Controlling Floating Device>

A process of controlling the floating device will be described below.

FIG. 6 is a block diagram showing the process of controlling the floating device according to the present embodiment. The processes of the constituents in FIG. 6 are performed by the center-of buoyancy controller 47. In FIG. 6, A* is a target value of A, ϕ denotes a posture angle of the craft body, $\theta_{COX}$ denotes an angle formed by the center of buoyancy and the center of gravity, $q_{ACOX}$ denotes a drive unit state of the floating device, $q_{all}$ denotes a whole drive unit state of the craft body including the floating device, Δx denotes a deviation in position between the center of buoyancy and the center of gravity, and $l_{COX}$ denotes a distance between the center of buoyancy and the center of gravity.

A first converter 471 converts an input target value ϕ* of the posture angle ϕ of the craft body to a target COX angle $\theta^*_{COX}$ and outputs the target COX angle $\theta^*_{COX}$ to a second calculator 477.

A first calculator 472 subtracts the posture angle ϕ of the craft body from the target value ϕ* of the posture angle ϕ of the craft body and outputs the subtraction result to an integrator 473 and a differentiator 475.

The integrator 473 integrates the posture angle deviation (ϕ*−ϕ) from the target posture angle which is the calculation result from the first calculator 472.

A first coefficient multiplier 474 multiplies the integration result from the integrator 473 by a coefficient $K_i$ and outputs the multiplication result to the second calculator 477. The processes of the integrator 473 and the first coefficient multiplier 474 are deviation correction.

The differentiator 475 differentiates the posture angle deviation (ϕ*−ϕ) from the target posture angle which is the calculation result from the first calculator 472.

A second coefficient multiplier 476 multiplies the differentiation result from the differentiator 475 by a coefficient $K_d$ and outputs the multiplication result to the second calculator 477. The processes of the differentiator 475 and the second coefficient multiplier 476 are damping.

The coefficients $K_i$ and $K_d$ are gains and are determined in advance, for example, by simulation.

The second calculator 477 adds the output of the first coefficient multiplier 474 and the output of the second coefficient multiplier 476 to the target COX angle $\theta^*_{COX}$ which is the output of the first converter 471 and outputs the addition result to a second converter 478.

The second converter 478 converts the addition result to a target deviation Δx* between the position of the center of buoyancy and the position of the center of gravity using the output of the second calculator 477 and the distance cox between the center of buoyancy and the center of gravity which is an output of a center-of-gravity and center-of-buoyancy calculator 482 and outputs the converted deviation Δx* in position between the center of buoyancy and the center of gravity to a third calculator 479.

The third calculator 479 subtracts the deviation Δ between the position of the center of buoyancy ad the position of the center of gravity which is the output of the center-of-gravity and center-of-buoyancy calculator 482 from the target deviation Δx* between the position of the center of buoyancy and the position of the center of gravity which is the output of the second converter 478 and outputs the subtraction result to a third converter 480.

The third converter 480 converts the output of the third calculator 479 to a control value $q_{ACOX}$ for the floating-device driven unit and outputs the converted control value $q_{ACOX}$ for the floating-device driven unit to a plant 481. Here, $q_{ACOX}$ is expressed by Expression (1).

[Math. 1]

$$q_{ACOX} = \begin{pmatrix} q_{ACOX1} \\ q_{ACOX2} \end{pmatrix} \tag{1}$$

The plant 481 includes all the driven units of the craft body including the floating device and is an image of the position and the posture of the craft body in an underwater environment. Sensors for detecting driven unit states and the posture sensor 67 for detecting a posture are attached to the floating device, the driven units, or the vicinity of the driven units. The plant 481 outputs $q_{all}$ to the center-of-gravity and center-of-buoyancy calculator 482 and outputs the posture angle $\phi$ of the craft body to the first calculator 472. $q_{all}$ is expressed by Expression (2). $q_{ACOX1}$, $q_{ACOX2}$, and $q_{others}$ may be angles or lengths.

[Math. 2]

$$q_{all} = \begin{pmatrix} q_{ACOX1} \\ q_{ACOX2} \\ q_{others} \end{pmatrix} \tag{2}$$

The center-of-gravity and center-of-buoyancy calculator 482 calculates the center of gravity and the center of buoyancy using $q_{all}$ output from the plant 481. The center-of-gravity and center-of-buoyancy calculator 482 calculates the deviation $\Delta x$ between the position of the center of buoyancy and the position of the center of gravity and the distance $l_{COX}$ between the center of buoyancy and the center of gravity using the calculation result.

(Process of First Converter)

Figure 7:
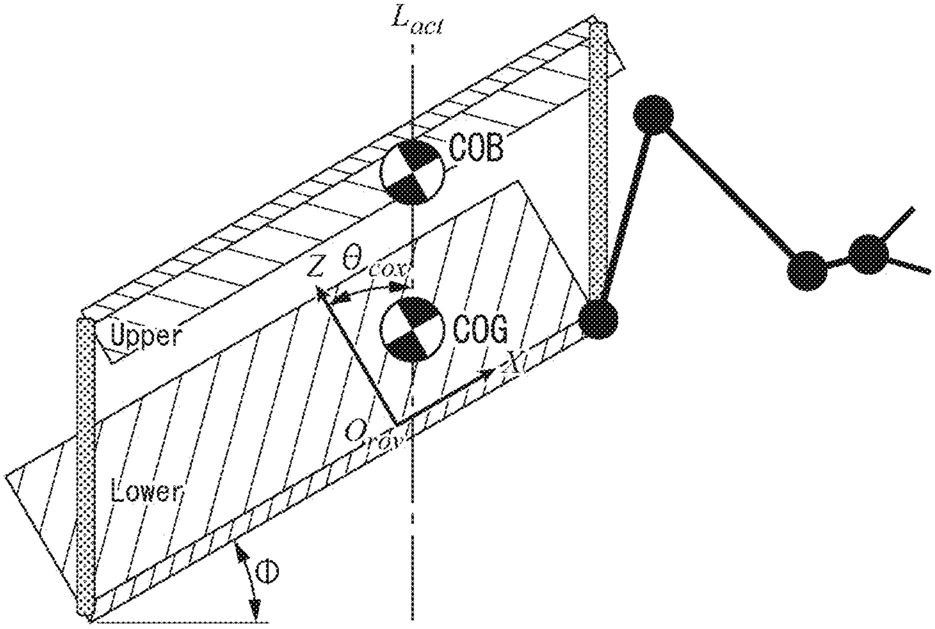
FIG. 7 is a diagram showing a process of conversion to a target COX angle according to the first embodiment.

The process of the first converter 471 will be described below in detail. FIG. 7 is a diagram showing a process of conversion to a target COX angle according to the present embodiment.

The center-of buoyancy controller 47 controls the posture of the craft body of the robot 1 using the angle formed by the center of buoyancy and the center of gravity as an amount of operation.

In FIG. 7, $\theta_{COX}$ (COX angle) is an angle formed by a line connecting the center of buoyancy and the center of gravity and a z axis in the craft body coordinate system of the robot 1. The craft body coordinate system defines the vertical direction of the craft body as the z direction.

Here, when a line segment $L_{act}$ is vertical in an inertial coordinate system, $\theta_{COX}$ is equal to the angle $\phi$ formed by the horizontal direction in the inertial coordinate system and the craft body as expressed by Expression (3). Accordingly, the target value $\phi^*$ of the posture angle $\phi$ of the craft body can be converted to the target COX angle $\theta^*_{COX}$ as expressed by Expression (4). The center-of buoyancy controller 47 acquires the posture angle $\phi$ of the craft body, for example, on the basis of the detected value of the posture sensor 67 via the acquirer 90.

[Math. 3]

$$\phi = \theta_{COX} \tag{3}$$

[Math. 4]

$$\phi^* = \theta^*_{COX} \tag{4}$$

Here, when there is no external force, the center of buoyancy and the center of gravity are arranged in a vertical line, and thus the angle formed by the center of buoyancy and the center of gravity is equal to the posture angle. Accordingly, according to the present embodiment, even when the center of gravity moves in the craft body (such as when the arm 31 operates), the craft body can be maintained in a target posture by maintaining the angle formed by the center of buoyancy and the center of gravity to be the same as the target posture.

(Integral Control and Differential Control)

Integral control using the integrator 473 and differential control using the differentiator 475 will be described below. FIG. 8 is a diagram showing an example of factors causing an error. When the robot moves or performs an operation under the water, a target posture may not be able to be maintained due to transportation of a heavy object, rapid movement of the center of gravity, thrust of a thruster, or other environmental factors, or the like as shown in FIG. 8.

Accordingly, as countermeasures thereof, in the present embodiment, an actual posture angle of the craft body is fed back and reflected in a control value for the floating device. By employing differential control, damping control is performed such that a posture angle velocity $\phi'$ is 0. By employing integral control, control is performed such that the posture angle deviation ($\phi^*-\phi$) from the target posture angle is 0.

(Conversion to Target Deviation Between Position of Center of Buoyancy and Position of Center of Gravity)

Figure 9:
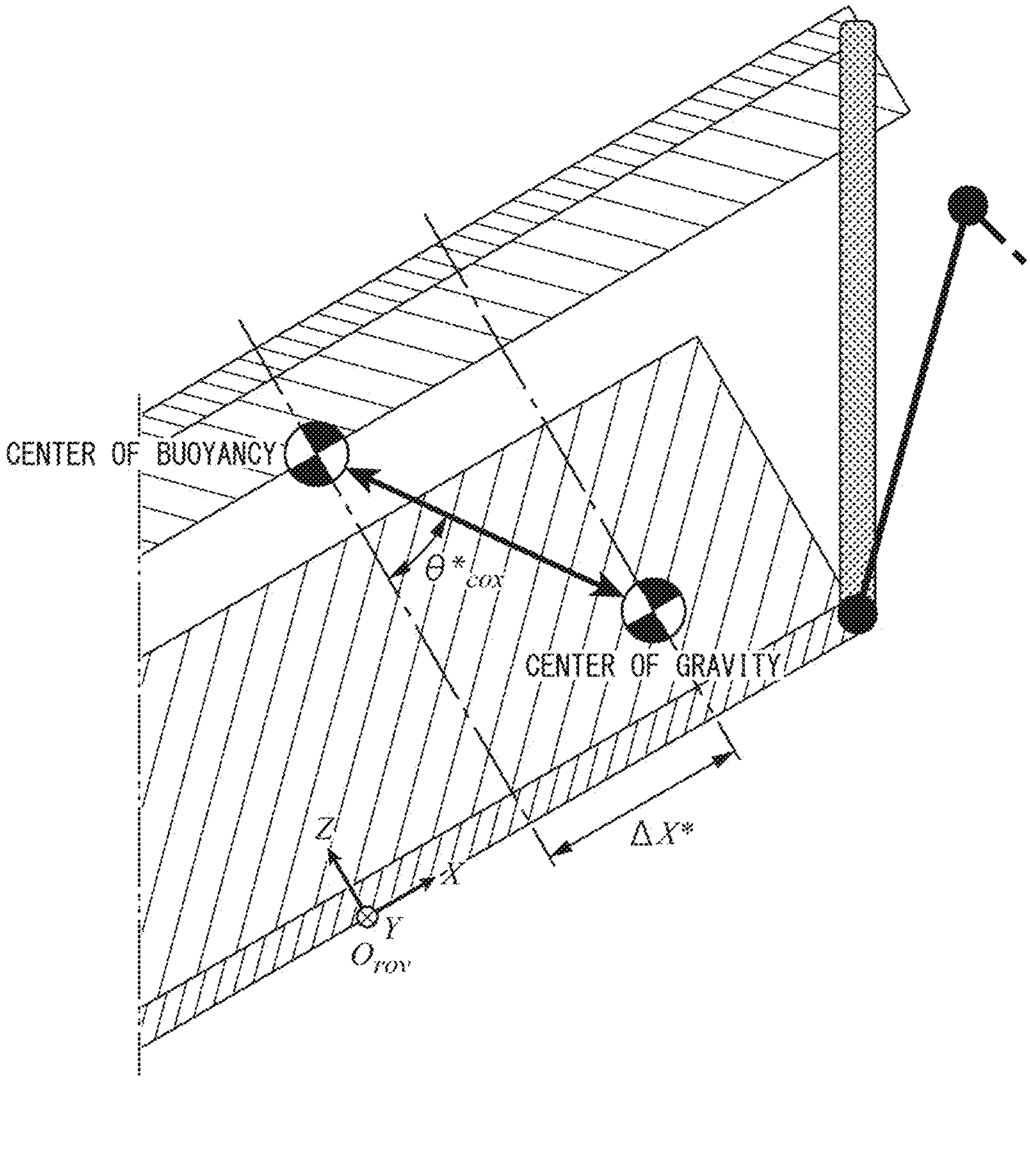
FIG. 9 is a diagram showing a process of conversion to a target deviation between a position of the center of buoyancy and a position of the center of gravity in a pitch direction.

A process of conversion to a target deviation between the position of the center of buoyancy and the position of the center of gravity which is performed by the second converter 478 will be described below in detail. FIG. 9 is a diagram showing a process of conversion to a target deviation between the position of the center of buoyancy and the position of the center of gravity in the pitch direction.

In FIG. 9, $l_{COX-xz}$ is a distance between the center of buoyancy and the center of gravity in the xz plane. $\Delta x^*$ is a target value of the deviation between the center of buoyancy and the center of gravity. $\theta^*_{COX}$ is a target COX angle.

From a relationship of a triangular function, the deviation $\Delta x^*$ between the center of buoyancy and the center of gravity can be expressed by Expression (5). The y-axis direction is a depth direction toward the ground surface. In this way, the second converter 478 converts the target COX angle $\theta^*_{COX}$ to the target value $\Delta x^*$ of the deviation between the center of buoyancy and the center of gravity using Expression (5). The second converter 478 acquires the distance $l_{COX-xz}$ between the center of buoyancy and the center of gravity in the xz plane from the center-of-gravity and center-of-buoyancy calculator 482.

[Math. 5]

$$\Delta x^* = \begin{bmatrix} l_{COX-XZ} \sin\theta^*_{COX} \\ l_{COX-YZ} \sin\theta^*_{COX} \end{bmatrix} \tag{5}$$

The example described above with reference to FIG. 9 is associated with the pitch direction, and the same calculation and conversion can be similarly performed in the roll direction.

(Conversion to Floating Device Driving Control Value)

Figure 10:
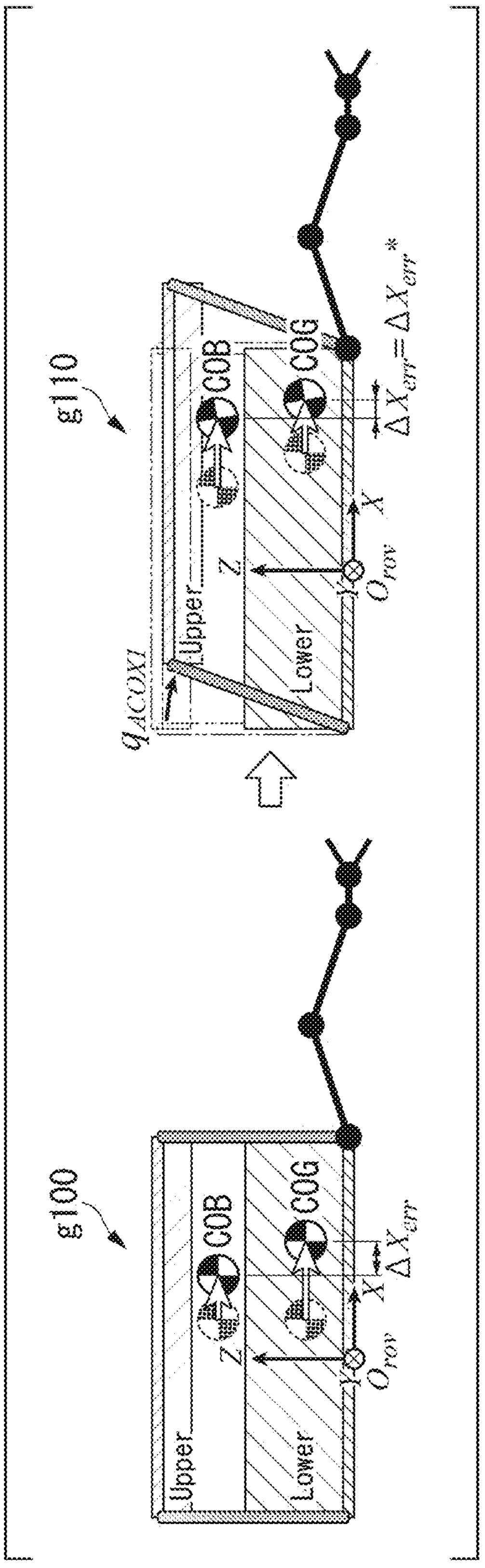
FIG. 10 is a diagram showing conversion to a floating device driving control value.

A process of conversion to a floating device driving control value that is performed by the third converter 480 will be described below in detail. FIG. 10 is a diagram showing conversion to a floating device driving control value. Reference sign g100 indicates a state example before the arm is stretched. Reference sign g110 indicates a state example after the arm is stretched, the position of the center of buoyancy and the position of the center of gravity move, and the floating device moves.

The third converter 480 acquires a result of subtraction of the deviation $\Delta x$ between the center of buoyancy and the center of gravity from the target value $\Delta x^*$ of the deviation between the center of buoyancy and the center of gravity from the third calculator 479. Here, the deviation $\Delta x$ between the center of buoyancy and the center of gravity is expressed by Expression (6). The position $x_{COB}$ of the center of buoyancy is expressed by Expression (7), and the position $x_{COG}$ of the center of gravity is expressed by Expression (8). In Expression (6), $\Delta X_{err}$ is a positional error in the x-axis direction between the center of buoyancy and the center of gravity, and $\Delta Y_{err}$ is a positional error in the y-axis direction between the center of buoyancy and the center of gravity. $X_G$ is the position of the center of gravity in the x-axis direction, $X_B$ is the position of the center of buoyancy in the x-axis direction, $Y_G$ is the position of the center of gravity in the y-axis direction, and $Y_B$ is the position of the center of buoyancy in the y-axis direction.

[Math. 6]

$$\Delta x = \begin{bmatrix} \Delta X_{err} \\ \Delta Y_{err} \end{bmatrix} = \begin{bmatrix} X_G - X_B \\ Y_G - Y_B \end{bmatrix} \tag{6}$$

[Math. 7]

$$x_{COB} = \begin{bmatrix} X_B \\ Y_B \end{bmatrix} \tag{7}$$

[Math. 8]

$$x_{COG} = \begin{bmatrix} X_G \\ Y_G \end{bmatrix} \tag{8}$$

In the present embodiment, when the deviation between the center of buoyancy and the center of gravity in a remote operating vehicle (ROV) coordinate system in a control value $q_{ACOX1}$ for the floating device driver is intended to be set to a predetermined target value $\Delta x^*$, the target value of the deviation is expressed by Expression (9).

[Math. 9]

$$\begin{bmatrix} (X_G + \Delta X_G) - (X_B + \Delta X_B) \\ (Y_G + \Delta Y_G) - (Y_B + \Delta Y_B) \end{bmatrix} = \begin{bmatrix} \Delta X^* \\ \Delta Y^* \end{bmatrix} \tag{9}$$

Accordingly, Expression (9) can be expressed as Expression (10), and the deviation is expressed by Expression (11).

[Math. 10]

$$\begin{bmatrix} X_G - X_B \\ Y_G - Y_B \end{bmatrix} - \begin{bmatrix} X_G - X_B \\ Y_G - Y_B \end{bmatrix} = \begin{bmatrix} \Delta X_B - \Delta X_G \\ \Delta Y_B - \Delta Y_G \end{bmatrix} \tag{10}$$

[Math. 11]

$$\begin{bmatrix} \Delta X_{err} \\ \Delta Y_{err} \end{bmatrix} - \begin{bmatrix} \Delta X^* \\ \Delta Y^* \end{bmatrix} = [J_{COB} - J_{COG}] \begin{bmatrix} q_{ACOX1} \\ q_{ACOX2} \end{bmatrix} \tag{11}$$

A center-of-buoyancy sensitivity matrix $J_{COB}$ which is a Jacobian matrix is expressed by Expression (12), and a center-of-gravity sensitivity matrix $J_{COG}$ which is a Jacobian matrix is expressed by Expression (13)

[Math. 12]

$$J_{COB} = \begin{bmatrix} \frac{\partial X_B}{\partial q_{ACOX1}} & \frac{\partial X_B}{\partial q_{ACOX2}} \\ \frac{\partial Y_B}{\partial q_{ACOX1}} & \frac{\partial Y_B}{\partial q_{ACOX2}} \end{bmatrix} \tag{12}$$

-continued

[Math. 13]

$$J_{COG} = \begin{bmatrix} \frac{\partial X_G}{\partial q_{ACOX1}} & \frac{\partial X_G}{\partial q_{ACOX2}} \\ \frac{\partial Y_G}{\partial q_{ACOX1}} & \frac{\partial Y_G}{\partial q_{ACOX2}} \end{bmatrix} \tag{13}$$

Here, when a different matrix between center-of-buoyancy sensitivity and center-of-gravity sensitivity is regular, the control value q can be calculated as an inverse matrix expressed by Expression (14).

[Math. 14]

$$\begin{bmatrix} \partial q_{ACOX1} \\ \partial q_{ACOX2} \end{bmatrix} = [J_{COB} - J_{COG}]^{-1} (\Delta x - \Delta x^*) \tag{14}$$

The center-of buoyancy controller 47 controls the posture of the robot 1, for example, through proportional-integral-differential (PID) control using the calculated control value q.

<Example of Process Flow>

Figure 11:
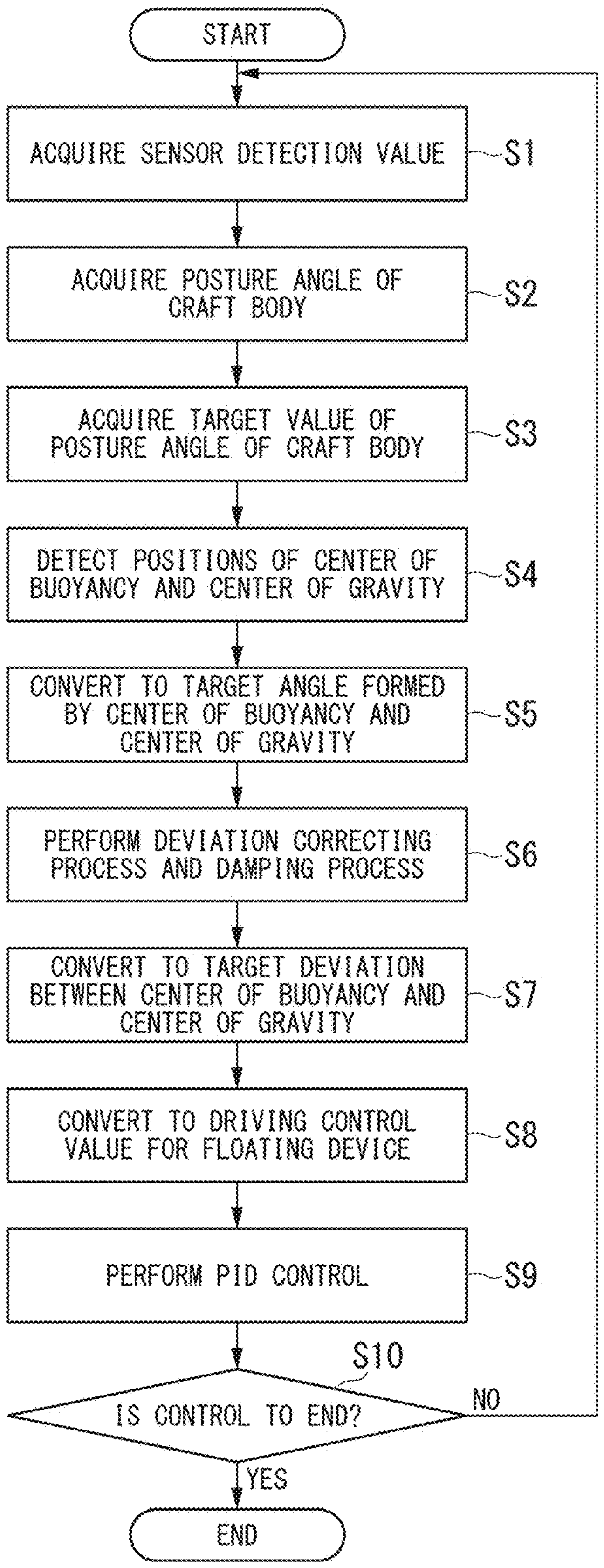
FIG. 11 is a flowchart showing an example of a control flow that is performed by a mobile object control device according to the first embodiment.

An example of a control flow that is performed by the mobile object control device 100 will be described below. FIG. 11 is a flowchart showing a control flow that is performed by the mobile object control device 100 according to the present embodiment.

(Step S1) The acquirer 90 acquires a detected value detected by a sensor such as the posture sensor 67.

(Step S2) The center-of buoyancy controller 47 acquires the posture angle of the craft body using the detected value acquired by the acquirer 90.

(Step S3) The target setter 91 sets a target value of an angle formed by the center of buoyancy and the center of gravity from the target posture. The target posture may be set in advance or may be set by allowing an operator to operate the operator 200. The center-of buoyancy controller 47 acquires a target value of the posture angle of the craft body set by the target setter 91.

(Step S4) The center-of buoyancy controller 47 acquires the position of the center of buoyancy and the position of the center of gravity through calculation based on the detected value detected by the acquirer 90.

(Step S5) The first converter 471 of the center-of buoyancy controller 47 converts an input target value $\phi^*$ of the posture angle $\phi$ of the craft body to a target COX angle $\theta^*_{COX}$.

(Step S6) The integrator 473 and the first coefficient multiplier 474 of the center-of buoyancy controller 47 perform feedback control which is a deviation correcting process by performing an integrating process. The differentiator 475 and the second coefficient multiplier 476 of the center-of buoyancy controller 47 perform feedback control which is a damping process by performing a differentiating process.

(Step S7) The second converter 478 of the center-of buoyancy controller 47 converts the distance $l_{COX}$ between the center of buoyancy and the center of gravity which is the output of the second calculator 477 and the output of the center-of-gravity and center-of-buoyancy calculator 482 to the target deviation $\Delta x^*$ between the position of the center of buoyancy and the position of the center of gravity.

(Step S8) The third converter 480 of the center-of buoyancy controller 47 converts the output of the third calculator 479 to the control value $q_{ACOX}$ for the floating device driver.

(Step S9) The center-of buoyancy controller 47 controls the posture of the robot 1, for example, through PID control using the calculated control value q.

(Step S10) The center-of buoyancy controller 47 determines whether to end control. The center-of buoyancy controller 47 may determine whether to start or end control on the basis of whether the arm is stretched or folded on the basis of a detected value of the arm sensor 65 or on the basis of a result of operation of the operator on the operator 200. When it is determined that control is to be ended (Step S10: YES), the center-of buoyancy controller 47 ends the process flow. When it is determined that control is not to be ended (Step S10: NO), the center-of buoyancy controller 47 returns the process flow to Step S1.

<Verification Result>

An example of a verification example will be described below.

Figure 12:
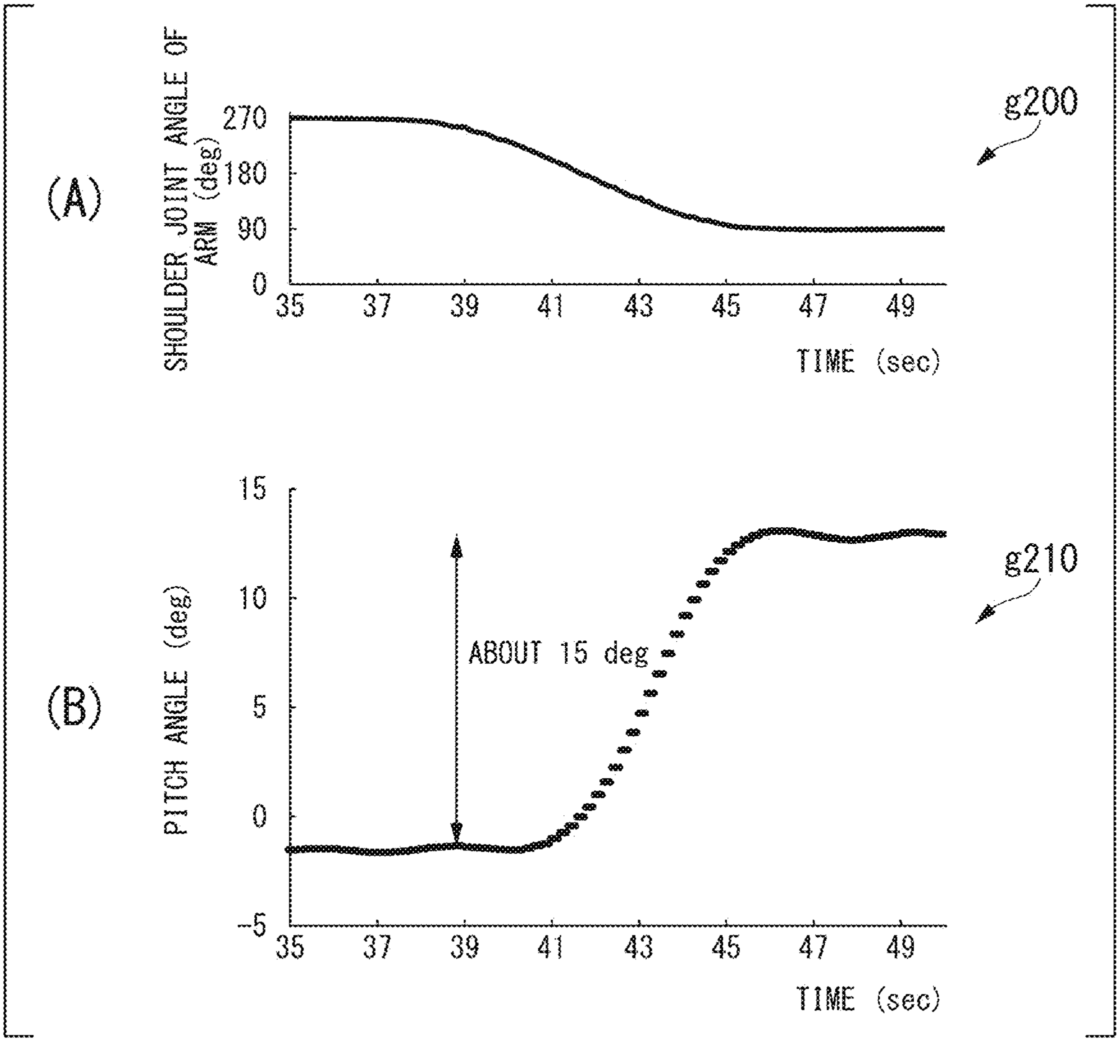
FIG. 12 is a diagram showing a verification result in control according to the related art.

FIG. 12 shows an example of a verification result when control according to the related art is performed. A graph of reference sign g200 indicates an example of change of a shoulder joint angle of the arm. In the graph of reference sign g200, the horizontal axis represents time (sec), and the vertical axis represents the shoulder joint angle (deg) of the arm. A graph of reference sign g210 indicates an example of change of an angle in the pitch direction. In the graph of reference sign g210, the horizontal axis represents time (sec), and the vertical axis represents the angle (deg) in the pitch direction.

As indicated by the graph of reference sign g210, a maximum error of the pitch angle is about 15 (deg) in the control according to the related art.

Figure 13:
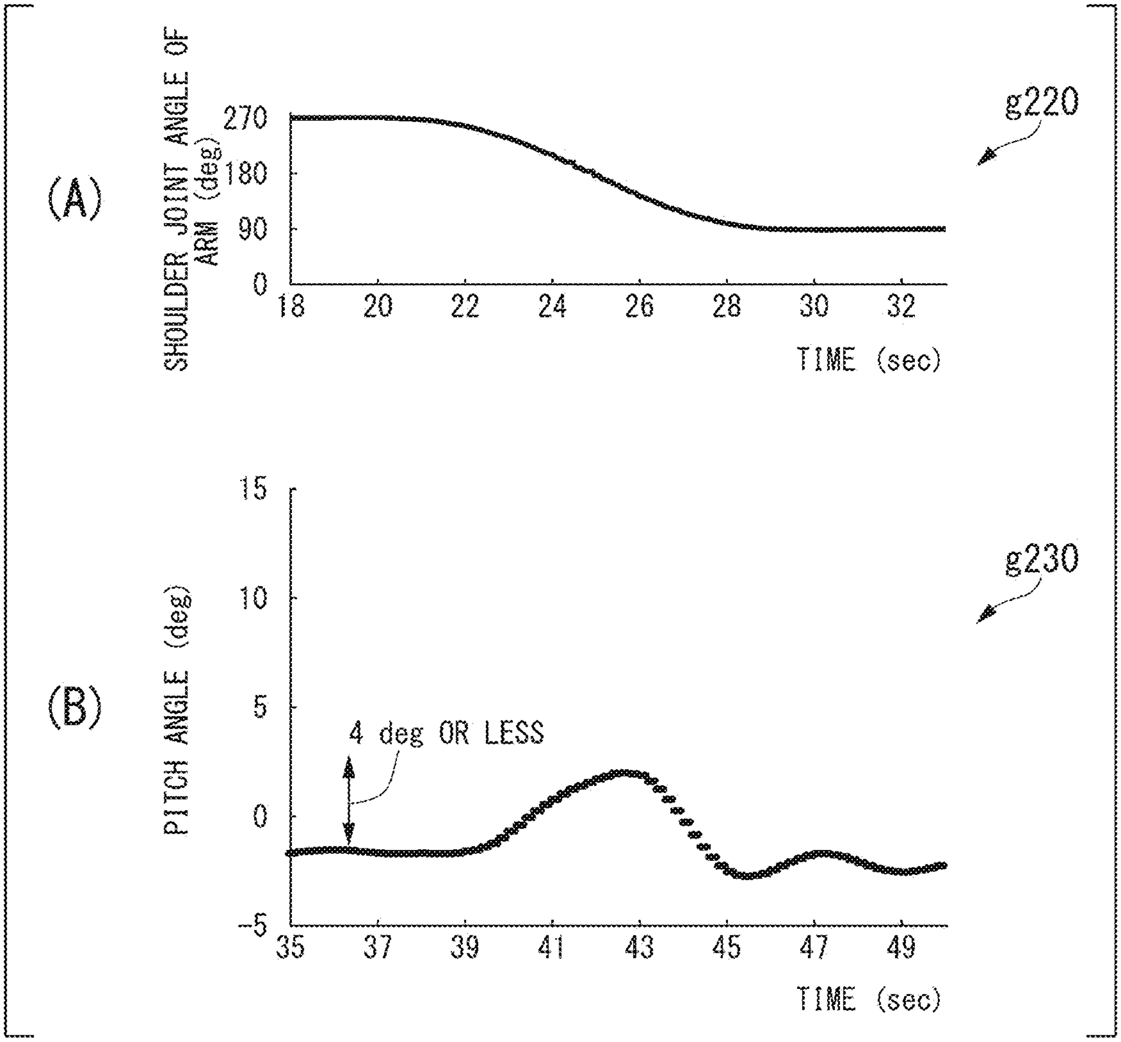
FIG. 13 is a diagram showing a verification result in a control method according to the first embodiment.

FIG. 13 shows an example of a verification result when a control method according to the present embodiment is performed. A graph of reference sign g220 indicates an example of change of a shoulder joint angle of the arm. In the graph of reference sign g220, the horizontal axis represents time (sec), and the vertical axis represents the shoulder joint angle (deg) of the arm. A graph of reference sign g230 indicates an example of change of an angle in the pitch direction. In the graph of reference sign g230, the horizontal axis represents time (sec), and the vertical axis represents the angle (deg) in the pitch direction.

As indicated by the graph of reference sign g230, a maximum error of the pitch angle is about 4 (deg) in the control method according to the present embodiment.

In this way, with the control method according to the present embodiment, it is possible to correct a tilt of the craft body due to change in posture of the arm of the robot 1.

(Damping Control)

An example of an ascertainment result of vertical vibration of an operation area which is a fingertip position of an end effector when damping control based on differential control according to the present embodiment has been performed and when the damping control has not been performed will be described.

Figure 14:
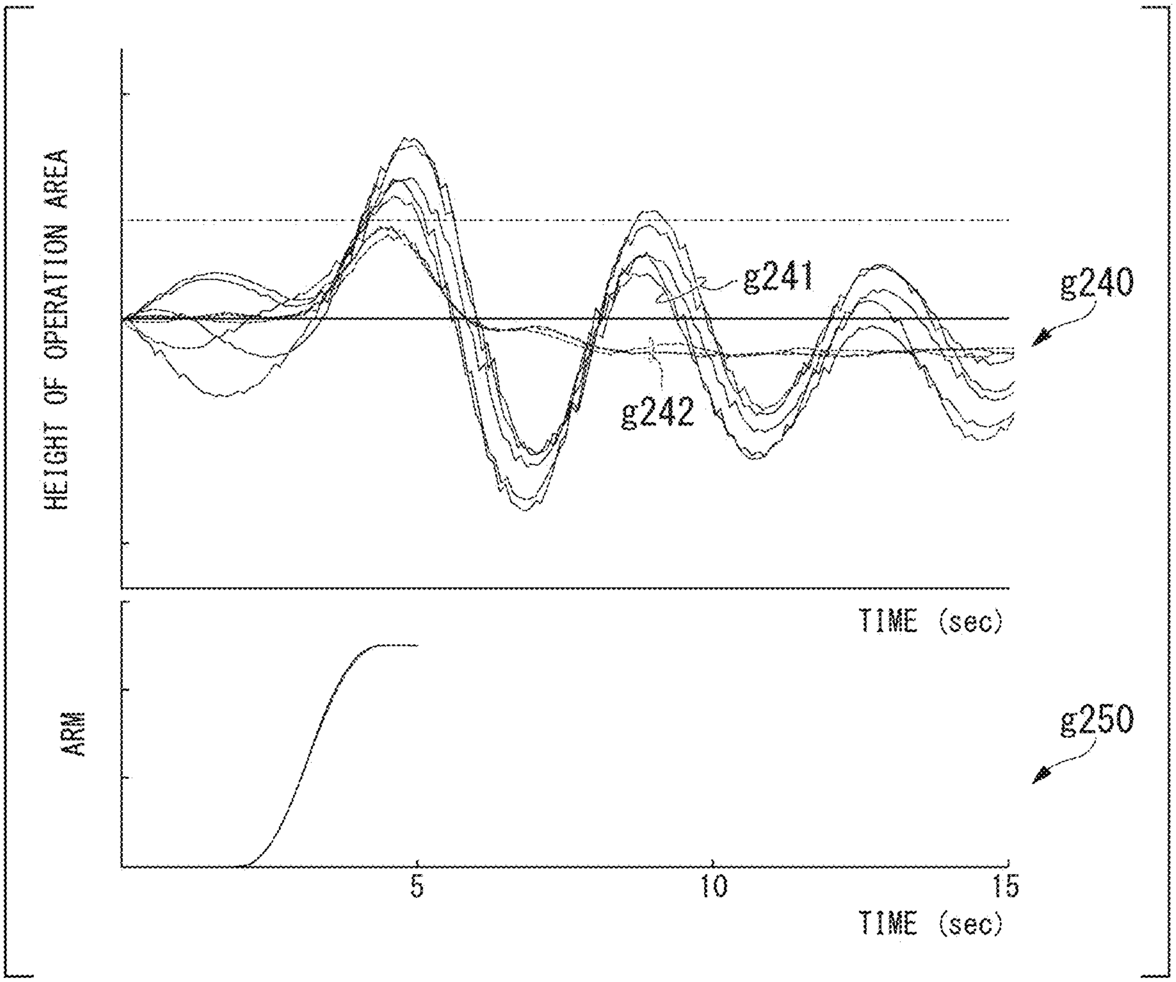
FIG. 14 is a diagram showing an example of an ascertainment result of vertical vibration of an operation area which is a fingertip position of an end effector when damping control according to the first embodiment has been performed and when the damping control has not been performed.

FIG. 14 is a diagram showing an example of an ascertainment result of vertical vibration of an operation area which is a fingertip position of an end effector when damping control according to the present embodiment has been performed and when the damping control has not been performed. A graph of reference sign g240 indicates an example of change in height of the operation area. In the graph of reference sign g240, the horizontal axis represents time (sec), and the vertical axis represents a height (mm) of the operation area. Curves of reference sign g241 indicate change in height of the operation area when damping control has not been performed. Curves of reference sign g242 indicate change in height of the operation area when damping control has been performed.

A graph of reference sign g250 indicates an example of change in length of the arm in a state in which the arm has been stretched from the folded state. In the graph of reference sign g250, the horizontal axis represents time (sec), and the vertical axis represents a length of the arm.

As indicated by the graph of reference sign g240, the height of the operation area at the time of rising changes from 33 (mm) when damping control has not been performed to 19 (mm) when damping control has been performed, and thus it is possible to curb vibration. A damping ratio of vibration changes from 0.1 when damping control has not been performed to 0.74 when damping control has been performed, and thus it is possible to curb vibration.

(Tilt Deviation-Offset Correction Control)

An example of an ascertainment result of vertical vibration of an operation area which is a fingertip position of an end effector when deviation-offset correcting control according to the present embodiment has been performed will be described.

Figure 15:
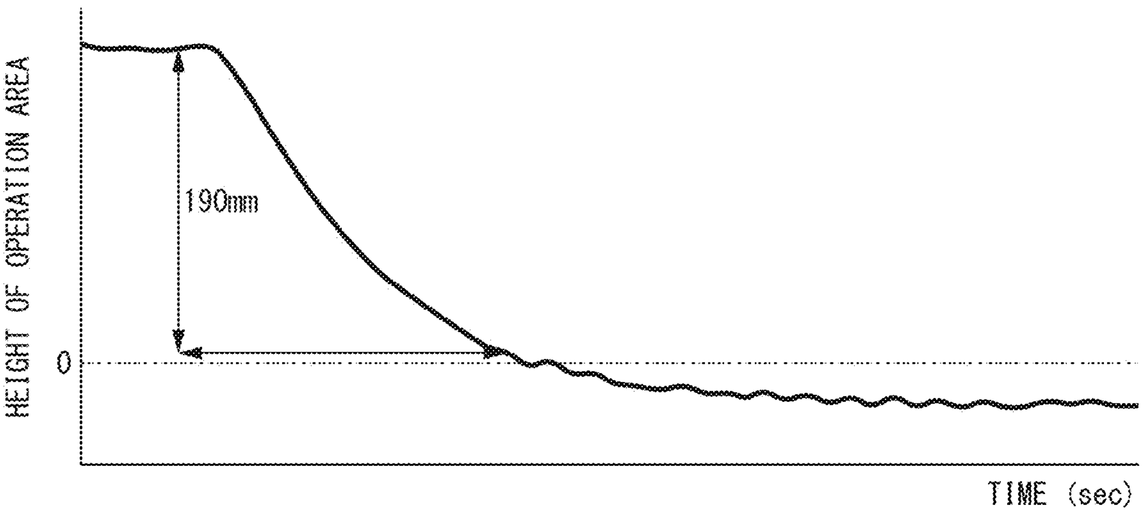
FIG. 15 is a diagram showing an example of change of an operation area which is a fingertip position of an end effector when deviation-offset correcting damping control according to the first embodiment has been performed.

FIG. 15 is a diagram showing an example of change of an operation area which is a fingertip position of an end effector when deviation-offset correcting damping control according to the present embodiment has been performed. The horizontal axis represents time (sec), and the vertical axis represents a height (mm) of the operation area. In the verification shown in FIG. 15, integral control is performed when a weight of 2.5 (Kg) is held by a fingertip and thus the craft body is tilted.

When a deviation of the operation area with the center of buoyancy as a rotation center is curbed to be less than a predetermined value (a target value) as shown in FIG. 15, an offset of a tilt of 190 (mm) can be corrected to about 18 (sec) which is less than the predetermined value through integral control.

As described above, according to the present embodiment, for example, when the arm moves and thus an error between the center of buoyancy and the center of gravity occurs, control based on the control angle value is performed such that the deviation in position between the center of buoyancy and the center of gravity is 0 (or less than a predetermined value). In the present embodiment, the deviation correcting process is performed through integral control. That is, in the present embodiment, I control in the PID control is added. In the present embodiment, a damping process is performed through differential control. For example, when the robot body 2 starts movement and then stops, fluctuation occurs, and the fluctuation appears in a camera image of an operator. Accordingly, D control in the PID control is added.

Accordingly, according to the present embodiment, when the posture of the arm changes, a control angle value for correcting the tilt of the craft body of the robot 1 can be calculated, and the tilt can be corrected using this correction control value. That is, according to the present embodiment, it is not necessary to construct an approximate expression for each posture of the driven unit such as the arm, and it is possible to cope with various types of movement of the arm. According to the present embodiment, it is possible to move the floating device according to movement of the arm and to maintain the craft body horizontally.

According to the present embodiment, it is possible to perform tilt deviation-offset correction (deviation correction) through integral control. That is, by adding I control in the PID control, it is possible to perform control such that the craft body returns to the horizontal state even when a heavy object is held by the arm.

According to the present embodiment, it is possible to curb an increase of (to damp) vibration due to change of the posture of the arm through differential control. That is, since D control in the PID control is added, it is possible to perform control such that fluctuation is immediately damped.

According to the present embodiment, it is possible to curb vibration even when the posture of the arm or the like provided in the robot changes.

According to the present embodiment, it is possible to curb change of the operation position of the fingertip of the arm even when the posture of the arm or the like provided in the robot changes.

Second Embodiment

In the first embodiment, by driving the links 5 and 6 to tilt the floating device, control is performed such that balance of the craft body is maintained, for example, when the arm is stretched from the folded state. In a second embodiment, the center of buoyancy or the center of gravity of the robot as a whole is controlled by horizontally moving the buoyant member in a two-dimensional direction without changing a height.

<Robot>

Figure 16:
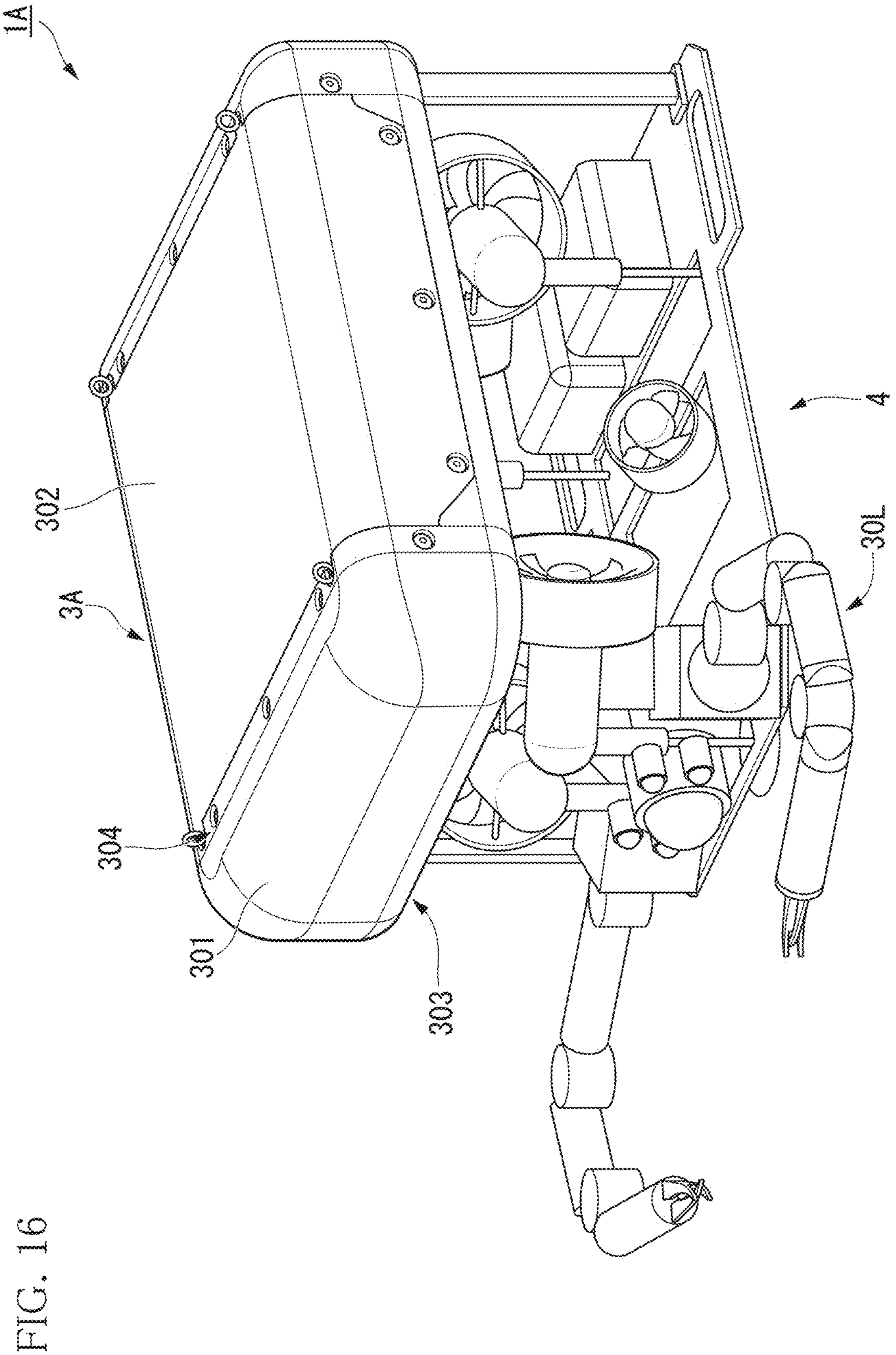
FIG. 16 is a perspective view of a robot according to a second embodiment.

An outer shape or the like of a robot 1A according to the present embodiment will be described below. FIG. 16 is a perspective view of the robot according to the present embodiment.

As shown in FIG. 16, the robot 1A includes a robot body 2 which is a body of the robot 1A. The robot body 2 includes an upper body 3A (a movable portion) that is located in an upper part of the robot body 2 and a lower body 4 (a stationary portion) that is located in a lower part of the robot body 2. In FIG. 16, only principal functional units of the robot 1A are referred to by reference signs.

The upper body 3A includes a cover 301, an upper buoyant member 302, a frame 303, and a frame 304. The configuration of the upper body 3A will be described in detail with reference to FIG. 17.

Figure 17:
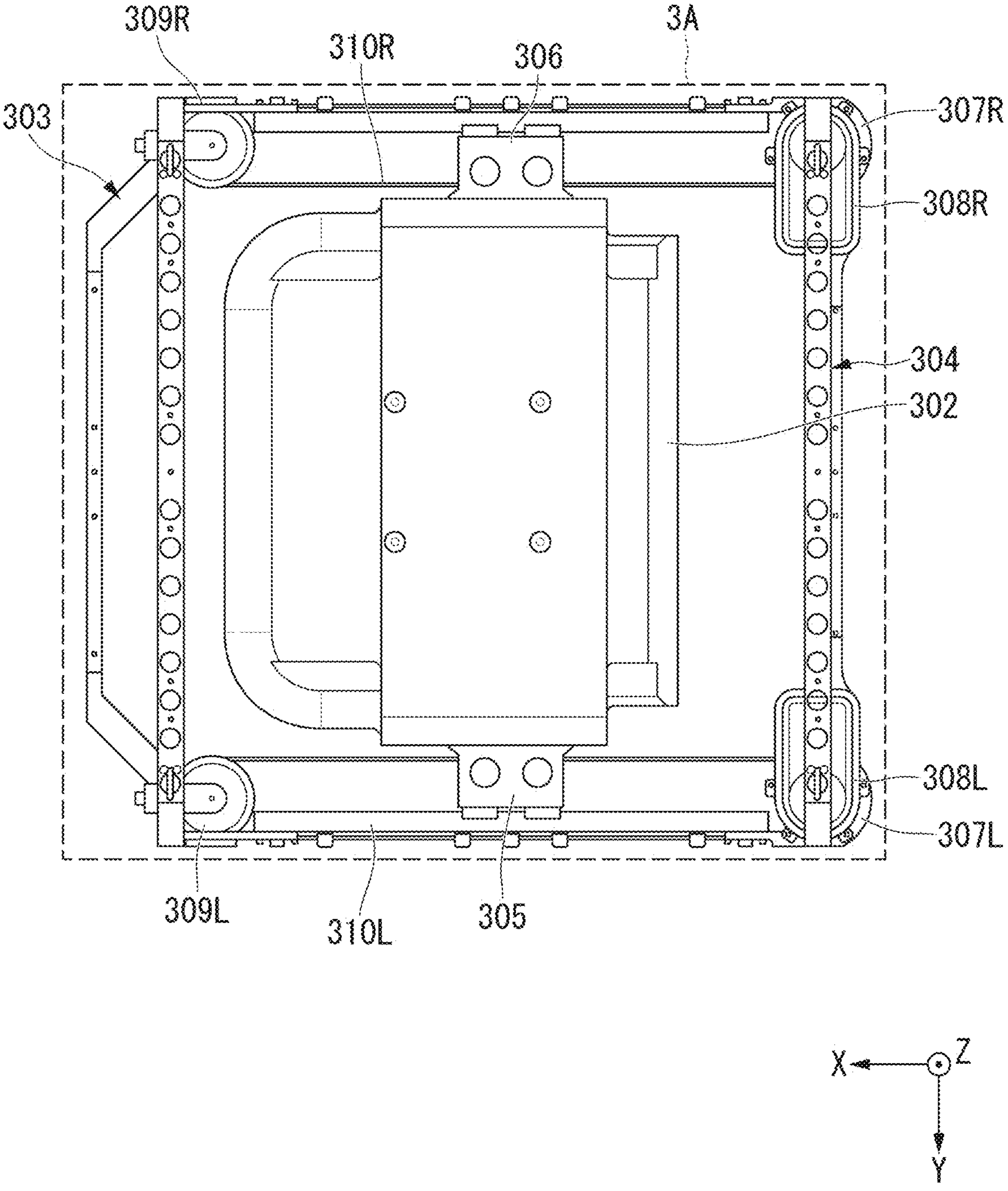
FIG. 17 is a top view showing an example of a configuration of an upper body (a movable portion) according to the second embodiment.

FIG. 17 is a top view showing an example of the configuration of the upper body (the movable portion) according to the present embodiment. In FIG. 17, the cover 301 is excluded.

As shown in FIG. 17, the upper body 3A includes, for example, the upper buoyant member 302, the frame 303, the frame 304, a slide portion 305, a slide portion 306, an actuator 307 (307L and 307R), an active pulley 308 (308L and 308R), a passive pulley 309 (309L and 309R), and a belt 310 (310L and 310R).

The frame 304 is attached to, for example, the frame 303.

The belt 310 is, for example, a flat caterpillar belt.

The actuator 307L rotates the belt 310L by driving the active pulley 308L.

The passive pulley 309L rotates with rotation of the belt 310L.

One end of the slide portion 305 is attached to the upper buoyant member 302, and the slide portion 305 moves in the x-axis direction with rotation of the belt 310L.

The actuator 307R rotates the belt 310R by driving the active pulley 308R.

The passive pulley 309R rotates with rotation of the belt 310R.

One end of the slide portion 306 is attached to the upper buoyant member 302, and the slide portion 306 moves in the x-axis direction with rotation of the belt 310R.

In the present embodiment, the actuator 307 is controlled in this way such that the upper buoyant member 302 attached to the slide portions 305 and 306 is moved in the x-axis direction and the y-axis direction with rotation of the belt 310. The actuator 307 includes an actuator for movement in the x-axis direction and an actuator for movement in the y-axis direction. Accordingly, according to the present embodiment, a structure in which two actuators cooperate to move in the x-axis direction and the y-axis direction by controlling the two actuators is obtained.

<Configuration Example of Mobile Object Control System>

An example of a configuration of a mobile object control system 400A according to the present embodiment will be described below. FIG. 18 is a diagram showing an example of the configuration of the mobile object control system according to the present embodiment. As shown in FIG. 18, the mobile object control system 400A includes, for example, a robot 1A and an operator 200.

The operator 200 includes, for example, a controller 201, an image display 202, and a communicator 203.

The robot 1A includes, for example, a robot body 2, an upper body 3A, a lower body 4, a manipulator 30, an upper thruster 10, a lower thruster 23, a camera 26, a camera sensor 27, a camera driver 28, a position sensor 35, an illumination 70, an arm sensor 65, a manipulator driver 66, a posture sensor 67, an actuator 307, an upper buoyant member 302, and a mobile object control device 100A. In the configuration example shown in FIG. 18, some of the constituents of the robot 1A described above with reference to FIGS. 16 and 17 are not shown.

The mobile object control device 100A includes, for example, a thruster drive device 25, a center-of buoyancy controller 47A, an acquirer 90, a target setter 91, a controller 92, a storage 93, and a communicator 94.

The center-of buoyancy controller 47A detects the position of the center of buoyancy and the position of the center of gravity and calculates a control angle $q_{ACOX1}$ for removing a deviation between the center of buoyancy and the center of gravity in the pitch direction (for example, the x-axis direction) on the basis of the detection result. The center-of buoyancy controller 47A controls the actuator 307 on the basis of the calculated control angle $q_{ACOX1}$ such that the upper body 3A moves in parallel without changing a height in the pitch direction.

(Conversion to Floating Device Driving Control Value)

A process of conversion to a floating device driving control value that is performed by the third converter 480 will be described below in detail. Blocks for the floating device control process are the same as shown in FIG. 6 according to the first embodiment.

Figure 19:
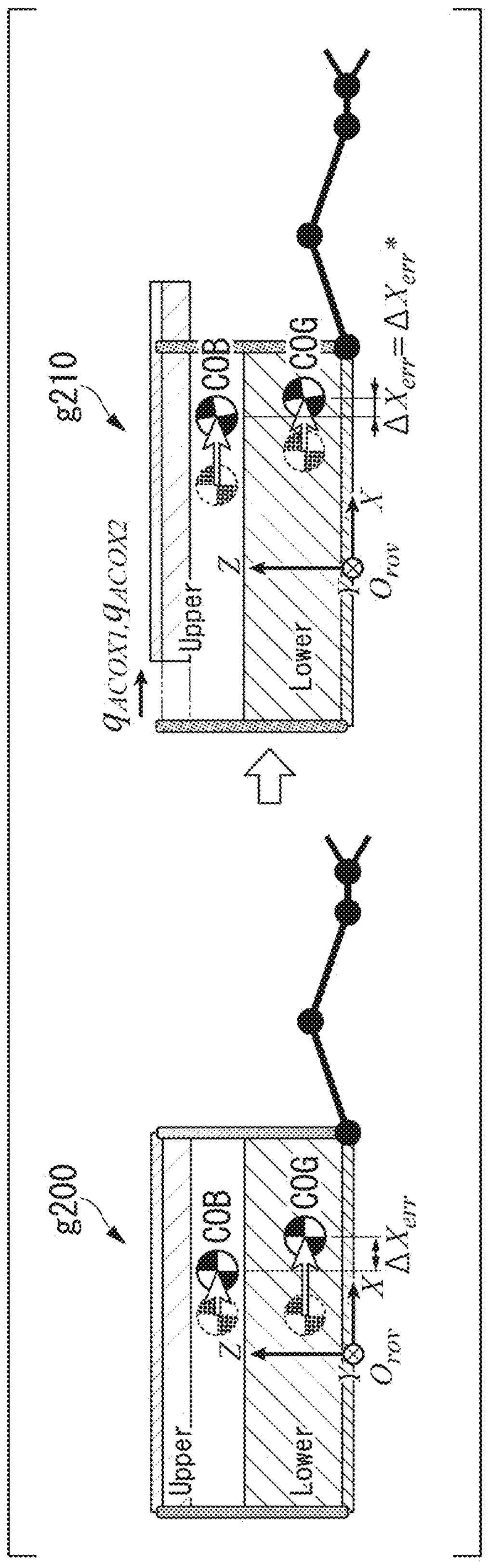
FIG. 19 is a diagram showing conversion to a floating device driving control value.

FIG. 19 is a diagram showing conversion to a floating device driving control value. Reference sign g200 indicates a state example before the arm is stretched. Reference sign g210 indicates a state example after the arm is stretched, the position of the center of buoyancy and the position of the center of gravity move, and the floating device moves.

The third converter 480 acquires a result of subtraction of the deviation Δx between the center of buoyancy and the center of gravity from the target value Δx* of the deviation between the center of buoyancy and the center of gravity from the third calculator 479. Here, the deviation Δx between the center of buoyancy and the center of gravity is expressed by Expression (6). The position $x_{COB}$ of the center of buoyancy is expressed by Expression (7), and the position $x_{COG}$ of the center of gravity is expressed by Expression (8). The center-of buoyancy controller 47A controls the posture of the robot 1A, for example, through PID control using the calculated control value q.

In the present embodiment, the upper buoyant member 302 is moved in parallel in the pitch direction without changing a height by performing control such that the error between the center of buoyancy and the center of gravity becomes the target value $\Delta x^*$ and the deviation $\Delta x$ between the center of buoyancy and the center of gravity on the same vertical line becomes the target value $\Delta x^*$.

In the example described above with reference to FIGS. 16 and 17, a configuration and an example in which the upper buoyant member 302 is moved in the pitch direction are shown, but the upper buoyant member 302 may be moved in the roll direction. In this case, the upper body 3A may include an actuator, a slide portion, an active pulley, a passive pulley, and a belt for the roll direction. The center-of buoyancy controller 47A may control the actuator for the roll direction such that the upper buoyant member 302 moves in parallel in the roll direction without changing its height.

A process flow that is performed by the mobile object control device 100A is the same as the process flow that is performed by the mobile object control device 100 according to the first embodiment.

A verification result according to the present embodiment is the same as the verification result according to the first embodiment.

As described above, according to the present embodiment, the buoyant member is moved in the pitch direction or the roll direction without changing the height by performing control such that the error between the center of buoyancy and the center of gravity becomes the target value and the deviation between the center of buoyancy and the center of gravity on the same vertical line becomes the target value.

Accordingly, according to the present embodiment, when the posture of the arm changes, it is possible to calculate the control angle value for correcting the tilt of the craft body of the robot 1A and to correct the tilt using this correction control value.

According to the present embodiment, it is possible to perform tilt deviation-offset correction (deviation correction) through integral control.

According to the present embodiment, it is possible to curb an increase of (to damp) vibration due to change of the posture of the arm through differential control.

In the aforementioned embodiments, a robot 1 (or 1A) performing an operation under the water is described as an example of a mobile object, but a work environment is not limited thereto. The work environment has only to be an environment in which an error between the center of buoyancy and the center of gravity occurs.

All or some of the processes that are performed by the mobile object control device 100 (or 100A) according to the aforementioned embodiments may be realized by recording a program for realizing all or some of the functions of the mobile object control device 100 (or 100A) according to the present invention on a computer-readable recording medium and causing a computer system to read and execute the program recorded on the recording medium. The "computer system" mentioned herein may include an operating system (OS) or hardware such as peripherals. The "computer system" mentioned herein may include a WWW system including a homepage provision environment (or display environment). The "computer-readable recording medium" may be a portable medium such as a flexible disk, a magneto-optical disc, a ROM, or a CD-ROM or a storage such as a hard disk incorporated into a computer system. The "computer-readable recording medium" may include a medium that holds a program for a predetermined time such as a volatile memory (RAM) in a computer system serving as a server or a client when the program is transmitted via a network such as the Internet or a communication circuit line such as a telephone line.

Some or all of these constituents may be realized by hardware (a circuit unit including circuitry) such as a large scale integration (LSI) circuit, an application-specific integrated circuit (ASIC), a field-programmable gate array (FPGA), a graphics processing unit (GPU), or a system on chip (SOC) or may be cooperatively realized by software and hardware.

The program may be transmitted from a computer system in which the program is stored in a storage device or the like to another computer system via a transmission medium or carrier waves in the transmission medium. Here, the "transmission medium" for transmitting a program is a medium having a function of transmitting information such as a network (a communication network) such as the Internet or a communication circuit line (a communication line) such as a telephone line. The program may be a program for realizing some of the aforementioned functions. The program may be a so-called differential file (a differential program) that can realize the aforementioned functions in combination with another program stored in advance in the computer system.

While modes for implementing the present invention have been described above in conjunction with embodiments, the present invention is not limited to such embodiments and has various modifications and substitutions applied thereto without departing from the gist of the invention.

What is claimed is:

1. A mobile object control system that controls a robot performing an operation under water, the mobile object control system comprising:

a robot body;

a floating device having a smaller density than a body connected to the robot body and including a drive unit that is able to change the center of buoyancy of the floating device with respect to the robot body; and a processor, wherein the processor executes a program to perform:

acquiring a position of the center of buoyancy of the robot body and the floating device combined, a position of the center of gravity of the robot body and the floating device combined, an angle formed by the position of the center of buoyancy and the position of the center of gravity, and a posture angle of the robot body;

setting at least one of a target value of an angle formed by the position of the center of gravity from a target posture of the whole robot and a target value of an angle formed by the position of the center of buoyancy from the target posture of the whole robot; and calculating a control value for the drive unit for change in the center of buoyancy of the floating device using a deviation between the position of the center of buoyancy and the position of the center of gravity, a target value of the deviation between the position of the center of buoyancy and the position of the center of gravity, a center-of-gravity sensitivity matrix indicating change of the position of the center of gravity with respect to the control value for the drive unit, and a center-of-buoyancy sensitivity matrix indicating change of the position of the center of buoyancy with respect to the control value for the drive unit.

2. The mobile object control system according to claim 1, wherein the processor performs feedback control in which a differential value of the posture angle of the robot body as a velocity term is substituted into the target value of the angle formed by the position of the center of buoyancy and the position of the center of gravity.

3. The mobile object control system according to claim 1, wherein the processor performs feedback control in which an integral term of a deviation of the posture angle of the robot body is substituted into the target value of the angle formed by the position of the center of buoyancy and the position of the center of gravity.

4. The mobile object control system according to claim 1, wherein the robot includes a movable portion and a stationary portion, wherein the movable portion is connected to the stationary portion by a link which is movable in at least one of a pitch direction and a roll direction, and wherein the processor controls the position of the center of buoyancy or the position of the center of gravity of the robot body by moving the link in at least one of the pitch direction and the roll direction based on the calculated control value for the drive unit.

5. The mobile object control system according to claim 1, wherein the robot includes a movable portion and a stationary portion, wherein the movable portion includes a member for controlling the position of the center of buoyancy or the position of the center of gravity of the whole robot through two-dimensional movement, and wherein the processor controls the position of the center of buoyancy or the position of the center of gravity of the robot body by moving the movable portion in at least one of the pitch direction and the roll direction based on the calculated control value for the drive unit.

6. The mobile object control system according to claim 1, wherein the processor converts the target value of the posture angle to a target angle, the processor converts the converted target angle to a target deviation between the position of the center of buoyancy and the position of the center of gravity using a distance between the position of the center of buoyancy and the position of the center of gravity, and the processor converts the converted target deviation between the position of the center of buoyancy and the position of the center of gravity and the deviation between the position of the center of buoyancy and the position of the center of gravity to a control value for the floating device.

7. A mobile object control device that controls a robot including a floating device having a smaller density than a body connected to a robot body performing an operation under water and including a drive unit that is able to change the center of buoyancy of the floating device with respect to the robot body, the mobile object control device comprising a processor, wherein the processor executes a program to perform:

acquiring a position of the center of buoyancy of the robot body and the floating device combined, a position of the center of gravity of the robot body and the floating device combined, an angle formed by the position of the center of buoyancy and the position of the center of gravity, and a posture angle of the robot body;

setting at least one of a target value of an angle formed by the position of the center of gravity from a target posture of the whole robot and a target value of an angle formed by the position of the center of buoyancy from the target posture of the whole robot; and calculating a control value for the drive unit for change in the center of buoyancy of the floating device using a deviation between the position of the center of buoyancy and the position of the center of gravity, a target value of the deviation between the position of the center of buoyancy and the position of the center of gravity, a center-of-gravity sensitivity matrix indicating change of the position of the center of gravity with respect to the control value for the drive unit, and a center-of-buoyancy sensitivity matrix indicating change of the position of the center of buoyancy with respect to the control value for the drive unit.

8. A mobile object control method of controlling a robot including a floating device having a smaller density than a body connected to a robot body performing an operation under water and including a drive unit that is able to change the center of buoyancy of the floating device with respect to the robot body, the mobile object control method comprising:

acquiring a position of the center of buoyancy of the robot body and the floating device combined, a position of the center of gravity of the robot body and the floating device combined, an angle formed by the position of the center of buoyancy and the position of the center of gravity, and a posture angle of the robot body;

setting at least one of a target value of an angle formed by the position of the center of gravity from a target posture of the whole robot and a target value of an angle formed by the position of the center of buoyancy from the target posture of the whole robot; and calculating a control value for the drive unit for change in the center of buoyancy of the floating device using a deviation between the position of the center of buoyancy and the position of the center of gravity, a target value of the deviation between the position of the center of buoyancy and the position of the center of gravity, a center-of-gravity sensitivity matrix indicating change of the position of the center of gravity with respect to the control value for the drive unit, and a center-of-buoyancy sensitivity matrix indicating change of the position of the center of buoyancy with respect to the control value for the drive unit.

* * * * *